(12) United States Patent
Nakajima

(10) Patent No.: US 6,910,764 B2
(45) Date of Patent: Jun. 28, 2005

(54) IMAGE RECORDING METHOD, ENERGY RADIATION CURABLE INK AND IMAGE RECORDING APPARATUS

(75) Inventor: Atsushi Nakajima, Hino (JP)

(73) Assignee: Konica Corporation (JP)

( * ) Notice: Subject to any disclaimer, the term of this patent is extended or adjusted under 35 U.S.C. 154(b) by 18 days.

(21) Appl. No.: 10/429,565

(22) Filed: May 5, 2003

(65) Prior Publication Data

US 2003/0222961 A1 Dec. 4, 2003

(30) Foreign Application Priority Data

May 9, 2002 (JP) ........................................ 2002-133991

(51) Int. Cl.⁷ ................................................ B41J 2/01
(52) U.S. Cl. ...................... 347/102; 347/101; 347/100
(58) Field of Search ................................. 347/102, 101, 347/96, 95, 100; 106/31–27

(56) References Cited

U.S. PATENT DOCUMENTS

| | | | |
|---|---|---|---|
| 4,508,811 A | | 4/1985 | Gravesteijn et al. |
| 5,227,227 A | | 7/1993 | Boulanger |
| 5,721,020 A | * | 2/1998 | Takami et al. ............... 427/508 |
| 6,145,979 A | | 11/2000 | Caiger et al. |
| 6,327,450 B1 | * | 12/2001 | Ito .............................. 399/227 |
| 6,554,414 B2 | * | 4/2003 | Ylitalo et al. ................ 347/102 |

FOREIGN PATENT DOCUMENTS

| | | |
|---|---|---|
| EP | 0 568 993 A2 | 11/1993 |
| JP | 60-132767 | 7/1985 |
| JP | 61-148444 | 7/1986 |
| JP | 6-043633 | 2/1994 |
| JP | 7-159983 | 6/1995 |
| JP | 8-224982 | 9/1996 |
| JP | 8-324137 | 12/1996 |
| JP | 09-134011 | 5/1997 |
| JP | 10-000863 | 1/1998 |
| JP | 11-271969 | 10/1999 |
| JP | 2001-125255 | 5/2001 |

* cited by examiner

Primary Examiner—Manish Shah
(74) Attorney, Agent, or Firm—Cantor Colburn LLP

(57) ABSTRACT

An image recording method, an image recording apparatus and energy radiation curable ink which can print high-quality images. The image recording method for ejecting and placing energy radiation curable ink which is cured when irradiated with energy radiation according to an ink-jet recording method, irradiating the energy radiation on a recording medium on which ink dots are formed, and printing an image, has: ejecting the energy radiation curable ink to the recording medium from a plurality of nozzles provided for an ink-jet head, moving the recording medium to the ink-jet head relatively, and forming the image; and controlling a range to which the energy radiation is irradiated, so as to correspond to a recording width of the ink-jet head.

28 Claims, 6 Drawing Sheets

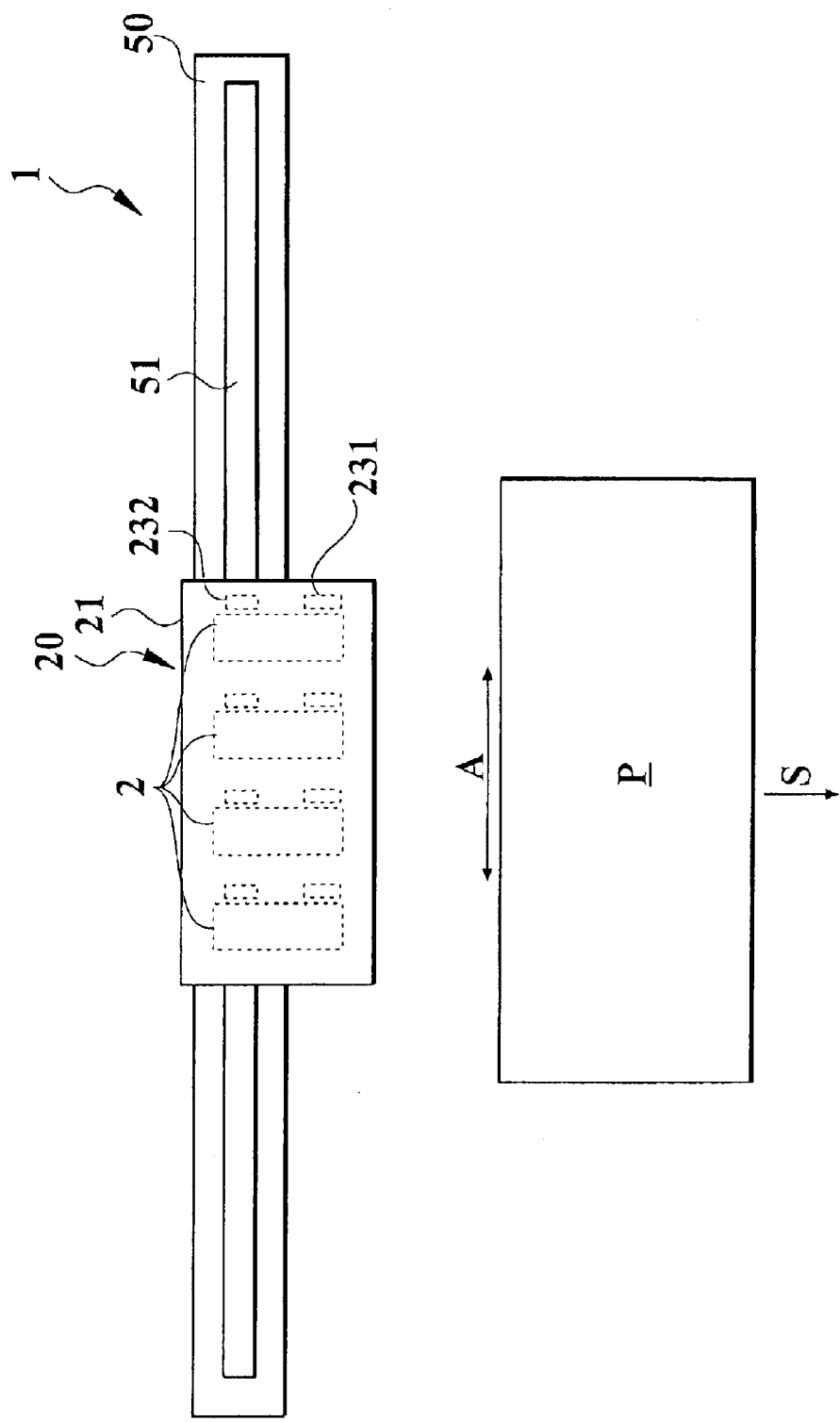

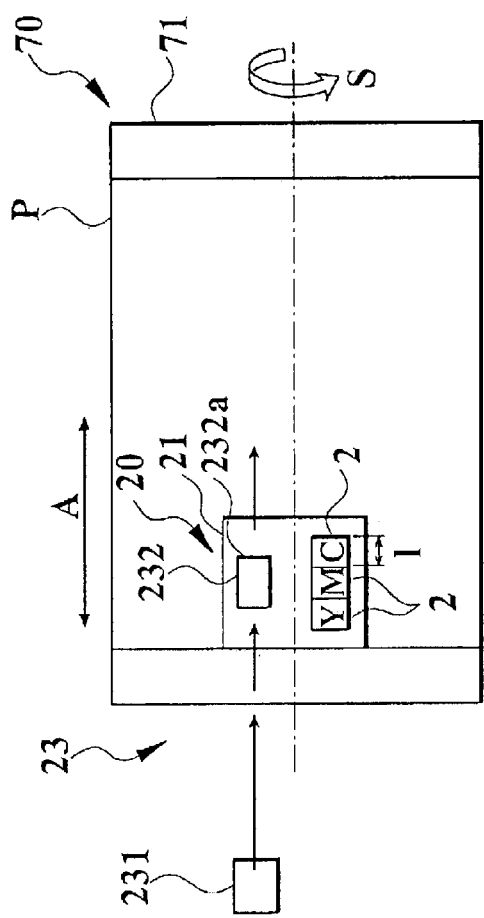
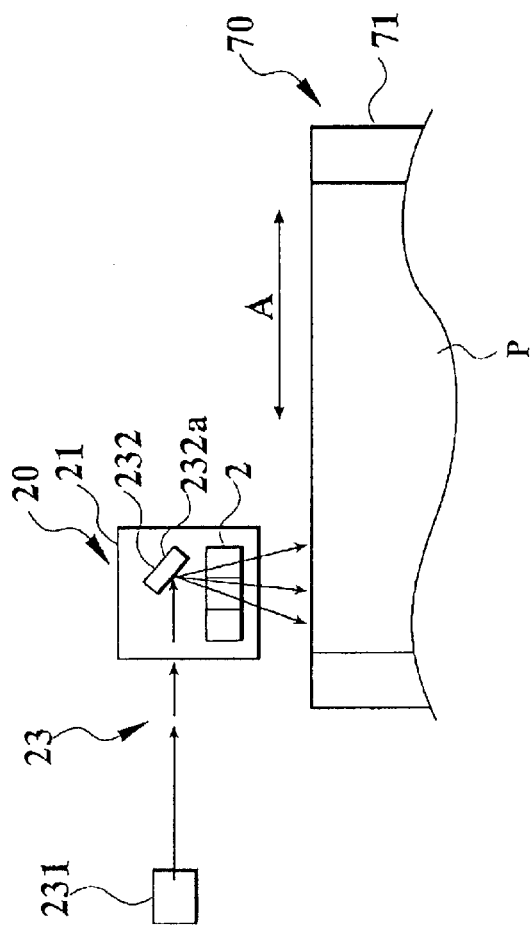

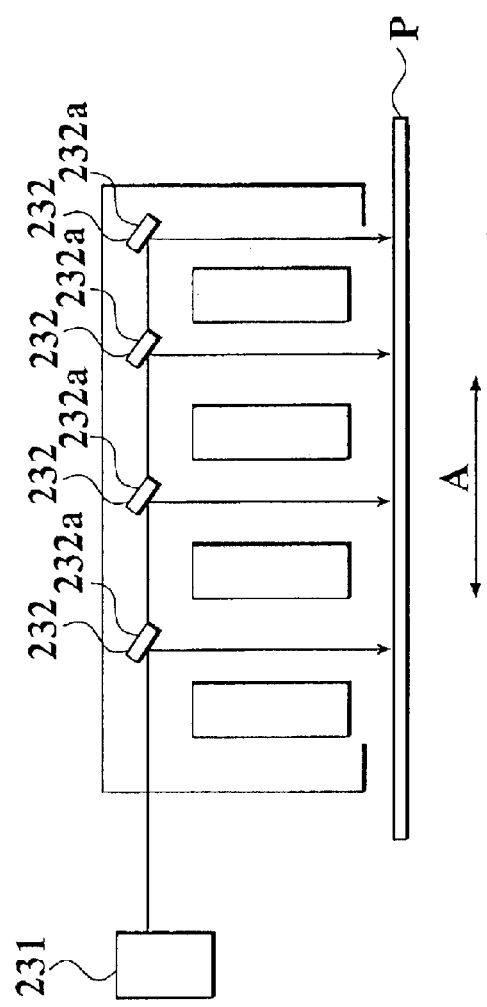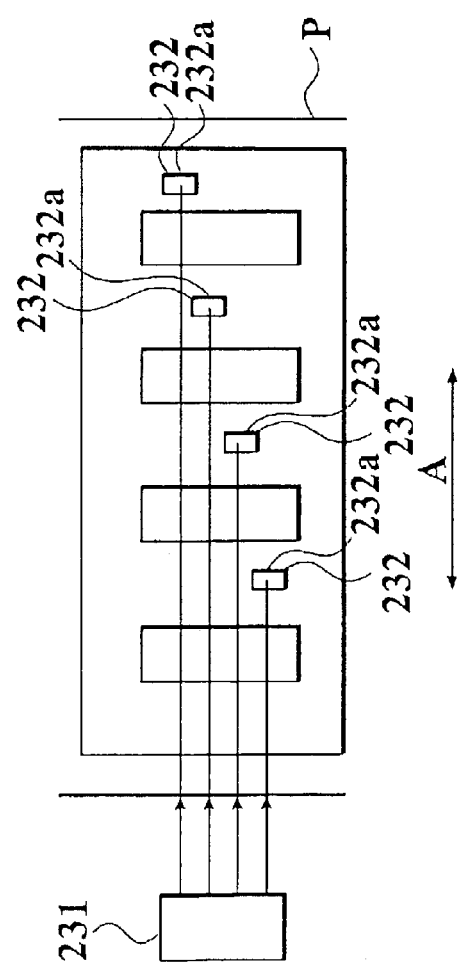

IMAGE RECORDING METHOD, ENERGY RADIATION CURABLE INK AND IMAGE RECORDING APPARATUS

BACKGROUND OF THE INVENTION

1. Field of the Invention

The present invention relates to energy radiation curable ink having a property to be cured when irradiated with energy radiation such as UV radiation, infrared radiation or the like, and an image recording method and an image recording apparatus for using the energy radiation curable ink and forming an image according to an ink-jet system.

2. Description of Related Art

An ink-jet recording method is an image printing method applicable to an on-demand print with a view to printing a small number of copies. In recent years, attention is paid to the ink-jet recording method, because specific papers are not required for the ink-jet recording method. An energy radiation curable ink jet system of the ink-jet recording method is a printing system for placing energy radiation curable ink having a proper to be cured when irradiated with energy radiation such as UV radiation or the like, on a recording medium, irradiating the energy radiation to the recording medium, and thereby curing the energy radiation curable ink.

A UV ink jet system as a kind of the energy radiation curable ink jet system is a printing system using UV ink having a property to be cured when irradiated with UV radiation as a kind of the energy radiation, as the energy radiation curable ink. According to the UV ink jet system, it is possible to print high-quality images by irradiating UV radiation and controlling a diameter of a dot placed.

In order to control the diameter of the dot placed, it is necessary to cure the UV ink immediately after placed on the recording medium. In order to cure the UV ink rapidly as described above, for example, there is a method that provides a UV light source such as a mercury lamp, a metal halide lamp, or the like, for a carriage holding an ink-jet head for ejecting ink so as to be movable, as disclosed in Japanese Patent Application Publication (Unexamined) No. Tokukai-sho 60-132767, and U.S. Pat. No. 61,459,797. However, according to the method, there is a problem that the weight of the carriage becomes heavy, the acceleration of the carriage is reduced, the efficiency of the image printing operation is lowered, or the whole ink-jet printer is bulky.

Further, a method has been known, the method for irradiating UV radiation from the carriage by using an optical fiber, or introducing UV radiation which is parallel rays with a mirror, as disclosed in Japanese Patent Application Publication (Unexamined) No. Tokukai-sho 60-132767, and U.S. Pat. No. 61,459,797. However, because the optical fiber is not bent very much, it is difficult to apply the optical fiber to the carriage movable. Further, because the UV radiation light source which has been generally applied to the ink-jet printer, is a spot light source, there is a problem that it is difficult to change the UV radiation to the parallel rays.

Furthermore, a recording method such as an external surface drum-scanning system or a line recording system, has been known, the recording method for moving mainly the recording medium, without moving the ink jet head or with moving the ink jet head at low speed. In case of applying the recording method, it is possible to irradiate UV radiation to the UV ink placed on the recording medium rapidly. However, in the case, it is difficult to realize both the small spaced UV radiation light source and the high irradiation of UV radiation to the recording medium. Specially, because it is necessary to irradiate UV radiation to the recording medium for every color of the color print, it is difficult to realize both the small spaced UV radiation light source and the high irradiation of UV radiation. Therefore, in case of irradiating UV radiation having high luminance to the UV ink placed on the recording medium rapidly, it has been necessary to enlarge the ink-jet printer.

SUMMARY OF THE INVENTION

The present invention is accomplished in order to solve the above-described problems.

An object of the present invention is to provide an image recording method, an image recording apparatus and energy radiation curable ink, which can efficiently print less bleeding, high-quality images, and reduce a size of the apparatus.

In order to attain the above-described object, in accordance with a first aspect of the present invention, an image recording method for ejecting and placing energy radiation curable ink which is cured when irradiated with energy radiation according to an ink-jet recording method, irradiating the energy radiation on a recording medium on which ink dots are formed, and printing an image, comprises: ejecting the energy radiation curable ink to the recording medium from a plurality of nozzles provided for an ink-jet head, moving the recording medium to the ink-jet head relatively, and forming the image; and controlling a range to which the energy radiation is irradiated, so as to correspond to a recording width of the ink-jet head.

In accordance with a second aspect of the present invention, an image recording apparatus for ejecting and placing energy radiation curable ink which is cured when irradiated with energy radiation according to an ink-jet recording method, irradiating the energy radiation on a recording medium on which ink dots are formed, and printing an image, comprises: an ink-jet head comprising a plurality of nozzles for ejecting the energy radiation curable ink, the ink-jet head for ejecting the energy radiation curable ink to the recording medium; a relative moving section for moving the recording medium to the ink-jet head relatively; an energy radiation irradiation section comprising a light emitting section for emitting the energy radiation and an irradiation control section for controlling a range on the recording medium to which the energy radiation is irradiated, the energy radiation irradiation section for irradiating the energy radiation to a portion on the recording medium on which the ink dots are formed; wherein the apparatus prints the image on the recording medium by ejecting the energy radiation curable ink to the recording medium from the ink-jet head, and moving the recording medium to the ink-jet head relatively by the relative moving section, and the irradiation control section controls the range so as to correspond to a recording width of the ink-jet head.

According to the method of the first aspect or the apparatus of the second aspect of the present invention, because the energy radiation is irradiated so as to correspond to the recording width of the ink-jet head, it is possible to irradiate the energy radiation to the ink dots rapidly, and prevent the ink dots from bleeding or expanding on the recording medium. Consequently, it is possible to cure the ink dots with controlling a dot diameter or a dot shape of each ink dot, and print high-quality images on the recording medium.

Further, even if the energy radiation is emitted from a device outputting low energy, such as a semiconductor laser or a LED, because the range on the recording medium to which the energy radiation is irradiated is controlled so as to correspond to the recording width of the ink-jet head, it is possible to net energy amount of the energy radiation irradiated to the ink dots. Consequently, it is possible to cure the ink dots rapidly, and print high-quality images.

Preferably, in the method of the first aspect of the present invention, the energy radiation is emitted from at least one of a laser device and a LED, and the irradiating the energy radiation is performed by scanning the recording medium with the energy radiation.

Preferably, in the apparatus of the second aspect of the present invention, the energy radiation irradiation section comprises a scanning section for scanning the recording medium by irradiating the energy radiation to the recording medium, the light emitting section emits the energy radiation from at least one of a laser device and a LED, and the irradiation control section controls the range by controlling a portion of the recording medium scanned by the scanning section.

According to the method or the apparatus, because the energy radiation is emitted from a device such as a laser device or a LED, it is possible to condense the energy radiation and change it to parallel rays easily. Because the energy radiation which is parallel rays is irradiated on the recording medium so as to correspond to the recording width of the ink-jet head, it is possible to easily irradiate the energy radiation having high energy per second and per inch, to the ink dots immediately after placed.

Further, because it is possible to prepare a compact optical system for changing the energy radiation to parallel rays, it is possible to prepare a compact image recording apparatus which can print high-quality images, easily.

Preferably, in the above-described method, the nozzles are arranged in a line, and the scanning the recording medium with the energy radiation is performed in a substantially parallel direction to a direction in which the nozzles are arranged.

Preferably, in the above-described apparatus, the nozzles are arranged in a line, and the scanning section scans the recording medium with the energy radiation in a substantially parallel direction to a direction in which the nozzles are arranged.

According to the method or the apparatus, because the energy radiation is irradiated in the direction of the arrangement of the ink dots which are formed at the substantially same time, it is possible to scan the ink dots formed on the recording medium with the energy radiation within the extremely small time difference. Consequently, it is possible to cure the ink dots substantially equally, and control the dot diameter and the dot shape of each ink dot substantially uniformly. As a result, it is possible to print high-quality images on the recording medium.

Preferably, in the method of the first aspect of the present invention, the moving the recording medium to the ink-jet head relatively includes moving the recording medium to the ink-jet head relatively by rotating a cylindrical drum having an external surface on which the recording medium is attached.

Preferably, in the apparatus of the second aspect of the present invention, the relative moving section comprises a cylindrical drum having an external surface on which the recording medium can be attached, and a driving rotating section for rotating the drum, and moves the recording medium to the ink-jet head relatively by rotating the drum in a condition that the recording medium is attached on the external surface of the drum.

According to the method or the apparatus, it is possible that the image recording apparatus printing images according to the external surface drum scanning system efficiently prints less bleeding, high-quality images on the recording medium. In addition, it is possible to prepare the compact image recording apparatus.

Preferably, in the method of the first aspect of the present invention, the ink-jet head is a line head, and the moving the recording medium to the ink-jet head relatively includes moving the recording medium to the ink-jet head relatively by carrying the recording medium in a vertical direction to the line head.

Preferably, in the apparatus of the second aspect of the present invention, the ink-jet head is a line head, and the relative moving section moves the recording medium to the ink-jet head relatively by carrying the recording medium in a vertical direction to the line head.

According to the method or the apparatus, it is possible that the image recording apparatus printing images according to the line recording system efficiently prints less bleeding, high-quality images on the recording medium. In addition, it is possible to prepare the compact image recording apparatus.

Preferably, in the method of the first aspect of the present invention, the nozzles are arranged so as to form the ink dots having a density of 300 dpi or higher on the recording medium when irradiating the energy radiation curable ink therefrom one time.

Preferably, in the apparatus of the second aspect of the present invention, the nozzles are arranged so as to form the ink dots having a density of 300 dpi or higher on the recording medium when irradiating the energy radiation curable ink therefrom one time.

According to the method or the apparatus, because the ink dots having the density of 300 dpi or higher can be formed on the recording medium when the energy radiation curable ink is ejected one time, it is possible to increase net energy of the energy radiation irradiated to the ink dots. Consequently, it is possible to print images having high-resolution rapidly without the ink dots expanding or bleeding on the recording medium.

Preferably, in the method of the first aspect of the present invention, a wavelength of the energy radiation is within a range from 250 to 450 nm or 800 nm or longer.

Preferably, in the apparatus of the second aspect of the present invention, a wavelength of the energy radiation emitted from the light emitting section is within a range from 250 to 450 nm or 800 nm or longer.

According to the method or the apparatus, it is possible to apply a well-known material or a well-known device which can be got easily, to the energy radiation curable ink or the light emitting section for emitting the energy radiation, respectively. Consequently, it is possible to prepare the energy radiation curable ink or the image recording apparatus easily, at low cost.

Preferably, in the method of the first aspect of the present invention, a luminance of the energy radiation irradiated to the recording medium is 1000 mW/cm$^2$ or higher.

Preferably, in the apparatus of the second aspect of the present invention, the energy radiation irradiation section comprises a condenser for condensing the energy radiation, and the condenser condenses the energy radiation so that a luminance of the energy radiation irradiated to the recording medium is 1000 mW/cm$^2$ or higher.

According to the method or the apparatus, because the luminance of the energy radiation is 1000 mW/cm$^2$ or higher when scanning the range of the recording medium, it is possible to prevent the energy radiation curable ink from bleeding or the like on the recording medium, and print high-quality images.

Preferably, in the above-described method, a time after the energy radiation curable ink is placed on the recording medium until the ink dots are scanned and irradiated with the energy radiation is within a range from 0.02 to 500 ms.

Preferably, in the above-described apparatus, the scanning section scans the recording medium with the energy radiation so that the ink dots are irradiated with the energy radiation after 0.02 to 500 ms since the energy radiation curable ink is placed on the recording medium.

According to the method or the apparatus, the energy radiation is irradiated to the ink dots at the time the energy radiation curable ink placed on the recording medium properly expands on the recording medium, by leveling as the ink dots. Consequently, it is possible to prevent the ink dots from bleeding on the recording medium, and print high-quality images.

Preferably, in the method of the first aspect of the present invention, a speed of moving the recording medium to the ink-jet head relatively is within a range from 0.3 to 200 m/s.

Preferably, in the apparatus of the second aspect of the present invention, the relative moving section changes a relative position of the recording medium to the ink-jet head at a speed within a range from 0.3 to 200 m/s.

According to the method or the apparatus, it is possible to print images efficiently, without enlarging the relative moving section for moving the recording medium relatively. Consequently, it is possible to prepare the compact image recording apparatus which can print image efficiently.

In accordance with a third aspect of the present invention, energy radiation curable ink used for the image recording method as described above, comprises: a polymerizable composition to form a polymer compound through polymerization reaction, an initiator for initiating the polymerization reaction when irradiated with the energy radiation, and a color material for coloring the energy radiation curable ink, wherein the initiator initiates the polymerization reaction when irradiated with the energy radiation having a wavelength which is within a range from 250 to 450 nm or 800 nm or longer.

According to the ink of the third aspect of the present invention, it is possible to apply a well-known material or a well-known device which can be got easily, to the energy radiation curable ink or the light emitting section for emitting the energy radiation, respectively. Consequently, it is possible to prepare the energy radiation curable ink or the image recording apparatus easily, at low cost.

Preferably, in the ink of the third aspect of the present invention, amount of addition of the initiator is within a range from 0.1 to 3 wt %.

According to the ink, when the energy radiation having the high luminance which is 1000 mW/cm$^2$ or higher is irradiated to the ink dots, a polymer compound is generated from the ink dots, at a proper molecular weight distribution. Consequently, it is possible to cure the ink dot with sufficient strength and adhesiveness to the recording medium. As a result, it is possible to print images having high durability, friction resistance or the like.

Preferably, the ink of the third aspect of the present invention, further comprises an initiation auxiliary for giving excitation energy to the initiator when irradiated with the energy radiation, and making the initiator initiate the polymerization reaction.

According to the ink, even if the initiator does not absorb the energy radiation emitted from the light emitting section although the initiator is selected by reasons of the property such as strength of the cured ink dots, because the initiation auxiliary is properly selected and added in the ink, it is possible to cure the ink dots efficiently. Consequently, it is possible to print high-quality images having high strength according to various recording mediums or uses.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein:

FIG. 1 is a top view for schematically showing an ink-jet printer 1 according to a first embodiment of the present invention;

FIG. 3A is a vertical top view of the main pert of the ink-jet printer 1 according to a second embodiment, and FIG. 3B is a vertical side view of the main part;

FIG. 5A is a vertical front view of the main part of the ink-jet printer 1 according to another example of the first embodiment, and FIG. 5B is a vertical top view of the main part.

PREFERRED EMBODIMENTS OF THE INVENTION

[First Embodiment]

Hereinafter, an ink-jet printer 1 which is an image recording apparatus for ejecting photo-curable ink having a property to be cured when irradiated with UV radiation as a kind of energy radiation curable ink, to a recording medium, and printing images, will be explained by way of example of the first embodiment of the present invention, with reference to the figures.

The ink-jet printer of the present invention is not limited to one using the photo-curable ink. The ink-jet printer may use energy radiation curable ink having a property to be cured when irradiated with energy radiation such as infrared radiation, visible radiation, electron rays, X-rays or the like. Herein, the energy radiation means energy radiation in a wide sense. The energy radiation includes not only one having a property of electrically separating air, but also one including an electromagnetic wave such as infrared radiation, visible radiation, UV radiation, electron rays or the like as described above.

The ink-jet printer 1 according to the first embodiment, prints images according to a capstan system for ejecting the photo-curable ink from an ink-jet head 2 with moving both the ink-jet head 2 and a recording medium P, and thereby forming an image on the recording medium P.

Figure 2B:
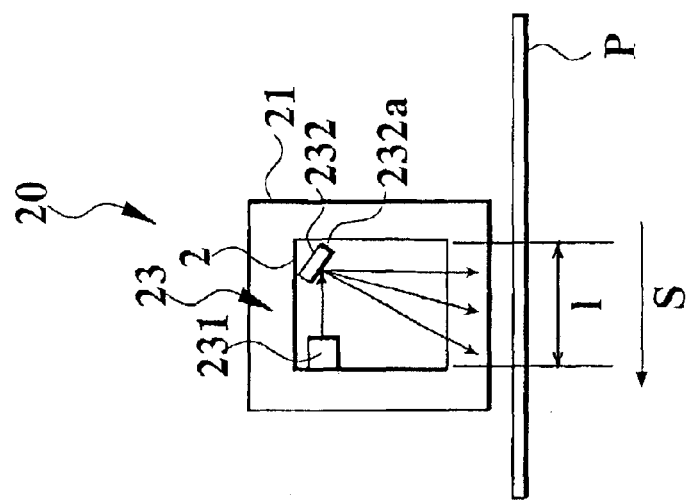
FIG. 2B is a vertical side view of the main part.
Figure 2A:
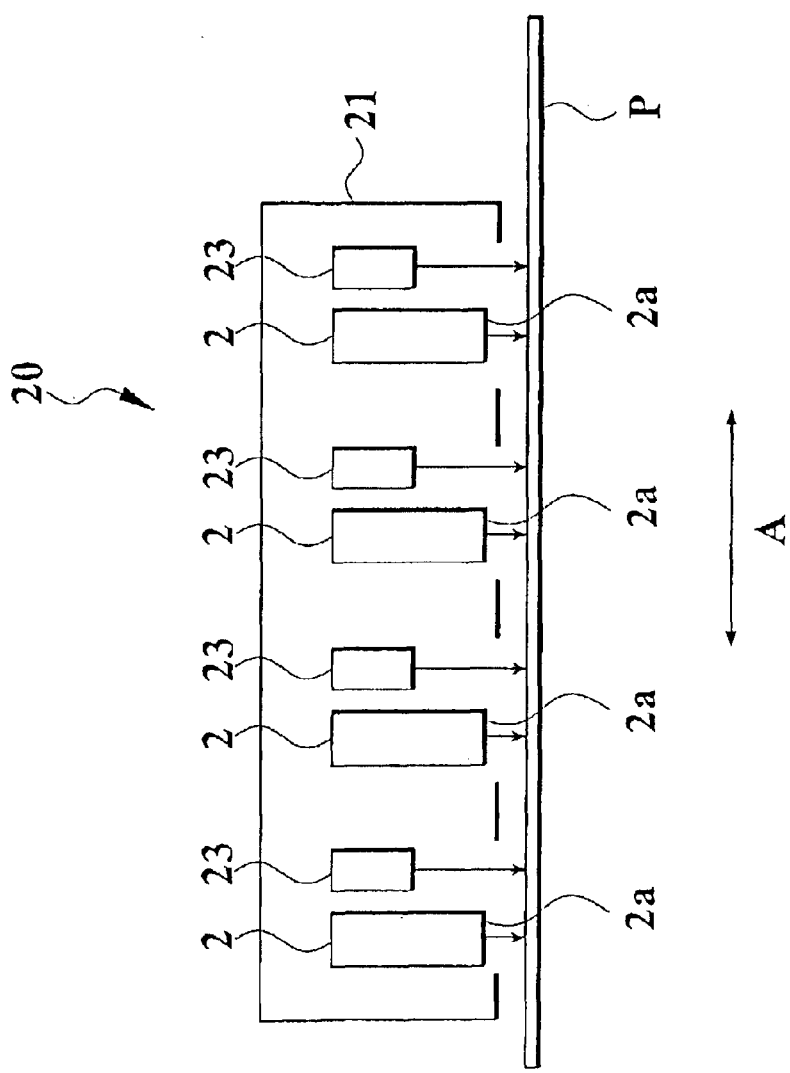
FIG. 2A is a vertical front view of a main part of the ink-jet printer 1 according to the first embodiment.

The ink-jet printer 1 comprises a relative moving section (which is not shown in figures), a printing section 20, a light irradiation section 23, a guide rail 50, and a controller (which is not shown in figures) for controlling each section, as shown in FIG. 1 and FIGS. 2A and 2B.

The relative moving section carries the recording medium P through a space under the carriage 21, in a direction of an arrow "S" (S direction) in FIG. 1 or FIG. 2B, at the time of the movement of the carriage 21. Thereby, the recording medium P moves to the ink-jet heads 2, 2 and so on, relatively, Preferably, the speed the relative moving section carries the recording medium P is within a range from 0.3 to 200 m/s. The speed less than 0.3 m/s causes a problem that the efficiency of printing images on the recoding medium P is lowered. On the other hand, the speed more than 200 m/s causes a problem that it is required to enlarge the relative moving section, and it is impossible to prepare the compact ink-jet printer 1.

The printing section 20 comprises ink-jet heads 2, 2 and so on, the carriage 21 and so on. A plurality of nozzles for ejecting the photo-curable ink to form ink dots on the recording medium P, are provided on a nozzle surface 2a of each ink-jet head 2, which is a surface to the recording medium P. A plurality of ink-jet heads 2, 2 and so on, and a plurality of light irradiation sections 23, 23 and so on are provided on the carriage 21, in a form that the ink-jet heads 2, 2 and so on and the light irradiation sections 23, 23 and so on are arranged alternately in the "A" direction, according to colors (for example, yellow, magenta, cyan, black) of the ink ejected to the recording medium P.

The carriage 21 has a structure movable in the direction ("A" direction) of the arrow "A" in FIGS. 1 or 2A, which is a horizontal direction along the guide rail 50. A linear encoder 51 is provided for the guide rail 50. The controller can obtain the present position of the carriage 21, on the basis of data outputted from the linear encoder 51.

A plurality of nozzles are arranged on the nozzles surface 2a of the ink-jet head 2, which is turned to the recording medium P. Further, the nozzles are arranged so as to be substantially parallel to the "S" direction when contained in the carriage 21. Furthermore, the nozzles are arranged so as to form ink dots on the recording medium P when ejecting the photo-curable ink of the length "1" shown in FIG. 2B, one time.

Herein, the recording width of the ink-jet head 2 is a length in the direction that the nozzles are arranged, of the range on which the ink dots can be formed without the ink-jet heads 2 moves. That is, the recording width of the ink-jet head 2 is the length "1" in FIG. 2B according to the embodiment.

Each nozzle is formed so as to connect to an ejecting section which is not shown in figures and which is contained in an inside of the ink-jet head 2. When the ejecting section drives, the photo-curable ink is ejected from each nozzle. Preferably, the distance between the plurality of nozzles provided on the nozzle surface 2a is determined so as to form the ink dots having the density of 300 dpi (dots per inch) or higher, on the recording medium P, when the photo-curable ink is ejected from the nozzles one time. Because the plurality of nozzles are provided at the distance, when the printing section 20 scans the recording medium P one time, by moving the recording medium P with a sub carrying section, and moving the carriage 21 in the "A" direction, it is possible to print images having a sufficient resolution on the recording medium P.

The light irradiation section 23 is an energy radiation irradiation section. The light irradiation section 23 comprises a light emitting section 231, a scanning section 232, a collimator (which is not shown in figures) and so on. When the light irradiation section 23 scans the range of the reading medium P, on which the ink dots are formed, by UV radiation, the ink dots are cured.

The light emitting section 231 comprises a well-known light emitting device which is a laser element (laser) such as a LED (Light emitting diode), a semiconductor laser element or the like.

Herein, the wavelength of UV radiation emitted from the light emitting section 231 is properly selected within a wavelength by which the photo-curable ink ejected from the ink-jet heads 2, 2 and so on can be cured rapidly. Preferably, the wavelength of UV radiation is 250 nm or longer. Because the wavelength of the light emitted from the light emitting section 231 is determined as described above, it is possible to apply a well-known light emitting device and the photo-curable ink having the following composition to the ink-jet printer 1, and print high-quality images on the recording medium P at low cost. For example, in case the wavelength of the UV radiation is shorter than 250 nm, it is extremely difficult to construct the optical system, that is the collimator, the scanning section 232 or the like, of materials transmitting the UV radiation having the wavelength. Therefore, the cost required to prepare or maintain the ink-jet printer 1, may increase.

Further, in case the energy radiation emitted from the light emitting section 231 is visible radiation, because an initiator or an initiation auxiliary (which will be explained as follows) included in the photo-curable ink absorbs the visible radiation, the initiator or the initiation auxiliary emits coloring. Therefore, there occurs a problem of inhibiting the color tone of the photo-curable ink. In case only ink having a strong color tone like black is applied to the photo-curable ink, like a black and white printing, if the photo-curable ink includes the initiator or the initiation auxiliary which absorbs visible radiation having a wavelength of 450 nm or shorter, the quality of the image is affected by the visible radiation. Accordingly, in the case, the visible radiation having the wavelength of 450 nm or shorter, can be applied as the energy radiation.

The collimator condenses the UV radiation emitted from the light emitting section 231, and changes it to parallel rays to make it reach the scanning section 232. Herein, preferably, the collimator is determined so as to condense the UV radiation and change it to parallel rays, so that luminance of the UV radiation is 1000 mW/m$^2$ or higher when the UV radiation reaches the recording medium P. Because the luminance of the UV radiation on the recording medium P is determined as described above, it is possible to cure the ink dots formed on the recording medium P rapidly, prevent the ink dots from bleeding or expanding unnecessarily, and form high-quality images on the recording medium P.

More preferably, the above-described collimator condenses the UV radiation so that the intensity of the UV radiation when reaching the recording medium P is 3000 mW/m$^2$ or higher. Because the intensity of the UV radiation on the recording medium P is 3000 mW/m$^2$ or higher, if the amount of addition of the initiator included in the photo-curable ink is reduced, it is possible to cure the photo-curable ink on the recording medium P rapidly, and prevent the ink dots from bleeding or expanding unnecessarily. Because a well-known initiator is expensive, when the amount of addition of the initiator in the photo-curable ink is reduced, and the photo-curable ink is cured rapidly, it is possible to from high-quality images on the recording medium P at low costs.

According to the embodiment, the scanning section 232 functions as the irradiation control section. The scanning section 232 comprises a galvanometer mirror 232a and a motor which is not shown in figures. The galvanometer mirror 232a deflects an angle to the light emitting section 231 by the motor, periodically, changes the optical path of the UV radiation emitted from the light emitting section 231, and irradiates the UV radiation to the recording medium P. Further, the scanning section 232 controls the angle range to which the galvanometer mirror 232a irradiates the UV radiation, and controls the range of the recording medium P, to which the UV radiation is irradiated. The galvanometer mirror 232a may drive by not the motor but an oscillator.

The width (the length in the "A" direction in FIG. 2A) of the range on the recording medium P, to which the light irradiation section 23 irradiates the UV radiation is determined on the basis of the diameter of the UV radiation condensed by the collimator.

The length (the length in the "S" direction in FIG. 2B) of the above-described range is determined on the basis of the range within which the galvanometer mirror 232a deflects the UV radiation.

The shape of the above-described range is determined so as to correspond to the range in which the ink dots are formed when the ink-jet heads 2 eject the ink to the recording medium P one time, without moving. More specifically, the shape of the range is determined so that the ink dots are formed on the recording medium P, irradiated with the UV radiation certainly and rapidly, and cured by using the energy of the UV radiation efficiently. Specially, preferably, the length of the range is determined to be the substantially same as the length "1" which is the recording wide of the ink-jet heads 2, with the view of using the energy of the UV radiation efficiently.

The position of the range on the recording medium P to which the light irradiation section 23 irradiates the UV radiation, is determined so that the ink dots are irradiated with the UV radiation immediately after formed by moving the carriage 21.

The period and the timing of the deflection of the UV radiation by the galvanometer mirror 232a, is determined so that the time after the photo-curable ink ejected from the ink-jet heads 2 are placed on the recording medium P until the photo-curable ink is irradiated with the UV radiation is within a range from 0.02 to 500 ms. In case the time is 0.02 ms or shorter, because the photo-curable ink placed on the recording medium P is cured without leveling sufficiently as an ink dot, the diameter of the dot is extremely small. Therefore, there occurs a problem that the quality of the image formed on the recording medium P is lowered, the adhesiveness of the ink dot on the recording medium P is lowered, and the strength of the image is lowered. On the other hand, in case the time is 500 ms or longer, because the photo-curable ink bleeds on the recording medium P or the like, the quality of the image formed on the recording medium P is lowered. Accordingly, for the above-described reasons, the period and the timing of the deflection of the UV radiation by the galvanometer mirror 232a, is determined in consideration of the dot diameter required for the ink dot, the moving speed of the carriage 21, the property of the photo-curable ink, the positional relation between the ink-jet heads 2 and the galvanometer mirror 232a, or the like, as the occasion may demand.

Preferably, the direction of scanning with UV radiation by the galvanometer mirror 232a is substantially parallel to the "S" direction in which the nozzles are arranged. Because the scanning direction is determined as described above, it is possible to scan the row of ink dots formed on the recording medium P at the substantially same time, with UV radiation. Therefore, it is possible to minimize the difference of time after each ink dot is formed on the recording medium P until it is irradiated with the UV radiation. Accordingly, because each ink dot is cured equally, it is possible to control the dot diameter and the shape of the dot, and improve the quality of the image.

The scanning section 232 may use not only the galvanometer mirror 232a but also a polygon mirror in order to change the optical path of the UV radiation emitted from the light emitting section 231. However, preferably, in the ink-jet printer 1 of the present invention, the scanning section 232 is composed so as to change the optical path of the UV radiation with the galvanometer mirror 232a, for following reasons.

The optical system to which the galvanometer mirror 232a is applied, can be made smaller than an optical system to which the polygon mirror is applied. In the ink-jet printer 1, because the light irradiation section 23 is provided for the carriage 21, it is preferable to apply the galvanometer mirror 232a to the scanning section 232, in order to provide the light and compact carriage 21.

However, there is a problem that the galvanometer mirror 232a is less accurate than the polygon mirror or the like, when deflecting the optical path. However, in the ink-jet printer 1, the diameter of UV radiation is larger than the diameter of the ink dot. Therefore, in case of scanning the ink dot with UV radiation in order to cure the ink dot, the high accuracy is not required when deflecting UV radiation. Accordingly, it is preferable to apply the galvanometer mirror 232a to the ink-jet printer 1 of the preset invention.

Next, the photo-curable ink applicable to the ink-jet printer 1 according to the present invention will be described.

The photo-curable ink is preferably blended so as to adjust its viscosity at 25° C. to 6 to 500 mPa·s and surface tension to 20 to 35 mN/m, so that the ink dots after placed on the recording medium P are appropriately leveled and exhibit adhesiveness. It is also preferable to control temperature of the photo-curable ink at the time of ejection thereof out from the ink-jet head 2 so that the ink exhibits a viscosity of 6 to 20 mPa·s in view of properly controlling the dot diameter on the recording medium P and preventing clogging of the ink within the nozzle.

It is also preferable to supply the photo-curable ink to the ink-jet head 2 after being filtered through a filter having a pore size of at least 2 μm or smaller, and more preferably 1 μm or smaller, so as to remove coarse particles.

Beside being furnished with the aforementioned physical properties, the photo-curable ink is composed so as to contain at least a polymerizable composition and an initiator, beside a color material for coloring, in order to allow itself to cure through polymerization reaction when irradiated with UV radiation from the light irradiation section 23. In addition, the photo-curable ink optionally contain an initiation auxiliary, surfactant, polymerization inhibitor, antistatic agent or the like. Depending of the wavelength of UV radiation to be irradiated, a sensitization dye is preferably added as an initiation auxiliary.

Specific compositions of the photo-curable ink will be explained below.

The polymerizable composition refers to a material which cures the photo-curable ink by forming a polymer through polymerization when irradiated with UV radiation. Publicly-known polymerizable compositions include photo-radical-polymerizable composition which polymerizes based on radical reaction under light irradiation, and cationic polymerizable composition based on a cationic polymerization system which polymerizes based on cationic species as reactive species. These are described for example in various patent documents such as Japanese Laid-Open Patent Publication No. Tokukai-hei 7-159983, Japanese Examined Patent Publication No. Tokuko-hei 7-31399, Japanese Laid-Open Patent Publication No. Tokukai-hei 8-224982, Japanese Laid-Open Patent Publication No. Tokukai-hei 10-863, and Japanese Patent Application No. Tokugan-hei 7-231444. Recently, a photo-curable resin based on a photo-cationic-polymerization system, sensitized up into a longer wavelength region from the visible radiation region, is also disclosed in Japanese Laid-Open Patent Publication Nos. Tokukai-hei 6-43633, and Tokukai-hei 8-324137, and so on.

The radical-polymerizable composition is a compound having an ethylene-base unsaturated bond capable of radical polymerization, where any compounds are allowable so far as they have at least one ethylene-base unsaturated bond capable of radical polymerization within their molecules. Further, the radical-polymerizable composition includes those having any chemical structures of monomer, oligomer, polymer or the like. As the polymerizable composition, the radical-polymerizable composition may be used independently, or in combination of two or more species in an arbitrary ratio of mixing in order to improve some target characteristics.

Specific examples of the compound having a radical-polymerizable, ethylene-base unsaturated bond include unsaturated carboxylic acids such as acrylic acid, methacrylic acid, itaconic acid, crotonic acid, isocrotonic acid, maleic acid, as well as salts, ester, urethane, amide and anhydride thereof; acrylonitrile; styrene; and various radical-polymerizable compositions such as unsaturated polyester, unsaturated polyether, unsaturated polyamide, and unsaturated urethane.

Specific examples of the radical-polymerizable compositions having an ethylene-base unsaturated bond include methacrylic derivatives enumerated below. The methacrylic derivatives include acrylic acid derivatives such as 2-ethylhexylacrylate, 2-hydroxyethylacrylate, butoxyethyl acrylate, carbitol acrylate, cyclohexyl acrylate, tetrahydrofurfuryl acrylate, benzylacrylate, bis(4-acryloxy-polyethoxyphenyl)propane, neopentyl glycol diacrylate, 1,6-hexanediol diacrylate, ethylene glycol diacrylate, diethylene glycol diacrylate, triethylene glycol diacrylate, tetraethylene glycol diacrylate, polyethylene glycol diacrylate, polypropylene glycol diacrylate, pentaerythritol triacrylate, pentaerythritol tetraacrylate, dipentaerythritol tetraacrylate, trimethylolpropane triacrylate, tetramethylolmethane tetraacrylate, oligoester acrylate, N-methylol acrylamide, diacetone acrylamide, epoxy acrylate; methyl methacrylate, n-butyl methacrylate, 2-ethylhexyl methacrylate, laryl methacrylate, allyl methacrylate, glycidyl methacrylate, benzyl methacrylate, dimethylaminomethyl methacrylate, 1,6-hexanediol dimethacrylate, ethylene glycol dimethacrylate, triethylene glycol dimethacrylate, polyethylene glycol dimethacrylate, polypropylene glycol dimethacrylate, trimethylolethane trimethacrylate, trimethylolpropane trimethacrylate, and 2,2-bis(4-methacryloxypolyethoxyphenyl)propane.

Other radical-polymerizable compounds include derivatives of allyl compounds such as allyl glycidyl ether, diallyl phthalate and triallyl trimellitate. More specifically, they are possibly publicly-known, radical-polymerizable or crosslinkable monomers, oligomers or polymers typically described in "Kakyozai Handobukku (Handbook on Crosslinking Agent)" (edited by Shinzo Yamashita, published by Taiseisha Co., Ltd., 1981); "UV.EB Koka Handobukku—Genryo-Hen (Handbook on UV/EB Curing—Source Material Series)" (edited by Kiyomi Kato, published by Kobunshi Kanko-Kai, 1985); "UV.EB Koka Gijutsu no Oyo to Shijo (Applications and Market of UV/EB Curing Technology)", p.79, (edited by RadTech Japan, published by CMC Publishing Co., Ltd., 1989); "Poriesuteru Rejin Handobukku (Handbook on Polyester Resin)" (written by Eiichiro Takiyama, published by The Nikkan Kogyo Shimbun, Ltd., 1988).

Amount of addition of the radical-polymerizable composition relative to the photo-curable ink is preferably selected within a range from 1 to 97 wt %. The amount of addition of the radical-polymerizable composition less than 1 wt % may inhibit rapid curing of the photo-curable ink which should be induced by UV irradiation, and thus may inhibit control of the dot-forming system. The amount of addition of the radical-polymerizable composition exceeding 97 wt % may inhibit satisfactory coloring by the color material, and thus may degrade color reproducibility of images possibly produced on the recording medium P. The amount of addition of the radical-polymerizable composition relative to the photo-curable ink is preferably selected within a range from 30 to 95 wt %.

As the polymerizable composition based on cationic polymerization system, preferably applicable examples include epoxy-type, UV-curable prepolymers and monomers having two or more epoxy groups within a single molecule, where both of them cause polymerization based on cationic polymerization. Examples of such prepolymers include alicyclic polyepoxides, polyglycidyl esters of polybasic acid, polyglycidyl ethers of polyhydric alcohol, polyglycidyl ethers of polyoxyalkylene glycol, polyglycidyl ethers of aromatic polyol, hydrogenated compounds of polyglycidyl ethers of aromatic polyol, urethane polyepoxy compounds and epoxidized polybutadienes. As the polymerizable composition, these prepolymers and monomers can be used independently or in a mixed form of two or more species.

Other examples of the cationic polymerizable composition contained in the photo-curable resin based on cationic polymerization system typically include (1) styrene derivatives, (2) vinylnaphthalene derivatives, (3) vinyl ethers and (4) N-vinyl compounds, as enumerated below:

(1) Styrene Derivatives styrene, p-methylstyrene, p-methoxystyrene, β-methylstyrene, p-methyl-β-methylstyrene, α-methylstyrene, p-methoxy-β-methylstyrene, etc.;

(2) Vinylnaphthalene Derivatives 2-vinylnaphthalene, α-methyl-2-vinylnaphthalene, β-methyl-2-vinylnaphthalene, 4-methyl-2-vinylnaphthalene, 4-methoxy-2-vinylnaphthalene, etc.;

(3) Vinyl Ethers isobutyl vinyl ether, ethyl vinyl ether, phenyl vinyl ether, p-methylphenyl vinyl ether, p-methoxyphenyl vinyl ether, α-methylphenyl vinyl ether, β-methylisobutyl vinyl ether, β-chloroisobutyl vinyl ether, etc.; and (4) N-vinyl Compounds N-vinylcarbazole, N-vinylpyrolidone, N-vinylindole, N-vinylpyrrole, N-vinylphenothiazine, N-vinylacetanilide, N-vinylethyl acetamide, N-vinylsuccinimide, N-vinylphthalimide, N-vinylcaprolactam, N-vinylimidazole, etc.

Content of the polymerizable composition in the cationic polymerization system to the photo-curable ink is preferably selected within a range from 1 to 97 wt %. The amount of addition of the cation-polymerizable composition less than 1 wt % may inhibit rapid curing of the photo-curable ink which should be induced by UV irradiation, and thus may inhibit control of the dot-forming system. The amount of addition of the radical-polymerizable composition exceeding 97 wt % may inhibit satisfactory coloring by the color material, and thus may degrade color reproducibility of images possibly produced on the recording medium P. The amount of addition of the cation-polymerizable composition relative to the photo-curable ink is preferably selected within a range from 30 to 95 wt %.

The photo-curable ink is added with an initiator for initiating polymerization reaction of the polymerizable composition under UV irradiation. The initiators respectively suited for either of the radical-polymerizable composition and cation-polymerizable composition are applied.

Publicly-known initiators applicable to the photo-curable ink containing the radical-polymerizable composition include aryl alkyl ketone, oxime ketone, acylphosphine oxide, acylphosphonate, thiobenzoic acid S-phenyl, titanocene, aromatic ketone, thioxanthone, benzyl and quinone derivatives and ketocoumarins.

Of these initiators, acylphosphine oxide and acylphosphonate are preferable as those for the radical-polymerization system. These initiators specifically have a high sensitivity to UV radiation, and active species generated therefrom by UV irradiation have a considerably low absorbance as compared with that of the initiators before irradiation. Because the photo-curable ink ejected out from the ink-jet head 2 and placed on the recording medium P have a thickness of as large as 5 to 15 μm, initiators such as acylphosphine oxide and acylphosphonate are preferable in view of rapid curing of the inner portion of the photo-curable ink placed on the recording medium P.

For this reason, specific examples of preferred initiators for the radical polymerization system include bis-(2,4,6-trimethylbenzoyl)-phenylphosphine oxide and bis-(2,6-dimethoxybenzoyl)-2,4,4-trimethylpentylphosphine oxide.

For the case where the initiators having a high UV sensitivity and also having a weak odor are to be selected, preferable examples thereof include 1-hydroxy-cyclohexyl-phenyl-ketone, 2-methyl-1-[4-(methylthio)phenyl]-2-morpholinopropane-1-one, 2-hydroxy-2-methyl-1-phenylpropane-1-one and 2-benzyl-2-dimethylamino-1-(4-morpholinophenyl)-butanone-1.

For the case where the initiators having a high UV sensitivity and also having a polymerization property less likely to be inhibited by oxygen in the air are to be selected, preferable examples thereof include a combination of 2-benzyl-2-dimethylamino-1-(4-morpholinophenyl)-butanone-1 with 1-hydroxy-cyclohexyl phenyl ketone, a combination of 1-hydroxy-cyclohexyl-phenyl-ketone with benzophenone, combinations of 2-methyl-1-[4-(methylthio)phenyl]-2-morpholinopropane-1-one or 2-methyl-1-[4-(methylthio)phenyl]-2-morpholinopropane-1-one with diethylthioxanthone or isopropylthioxanthone, a combination of benzophenone with acrylic acid derivative having a tertiary amino group, and addition of a tertiary amine.

The initiator is preferably added into the photo-curable ink, in an amount of 0.1 to 3 wt %. The amount of addition of the initiator less than 0.1 wt % may make it difficult to control diameter or shape of the ink dots because the photo-curable ink placed on the recording medium cannot rapidly be cured. The amount of addition exceeding 3 wt % may undesirably increase the number of polymerization nuclei because the concentration of reactive species generated during the polymerization reaction becomes considerably high, and this consequently inhibits polymerization of the polymerizable composition in a large degree of polymerization and thus considerably lowers strength of the cured photo-curable ink or adhesiveness on the recording medium P.

It is to be noted that the amount of addition described in the above is lower than that for the photo-curable ink (5 to 15 wt %) which has been applied to the conventional ink-jet printers using a high pressure mercury lamp or metal halide lamp as the light emitting section. This is because luminance of UV radiation to be irradiated to the ink dots in the present invention is as high as 1,000 mW/cm² and is considerably higher than that in the conventional cases. Therefore, if the initiator is added in an amount same as that applied to the conventional ink-jet printers, the ink dots irradiated by such a high luminance of UV radiation initiates a polymerization reaction only to produce polymer compounds having considerably low molecular weights, and the strength and adhesiveness to the recording medium P of thus cured photo-curable ink become low as a consequence.

It is to be noted that two or more initiators can be used together in the present invention. Besides the compounds shown in the above, the initiator may also be any of the publicly-known compounds described for example in "UV.EB Koka Gijutsu no Oyo to Shijo (Applications and Market of UV/EB Curing Technology)" (published by CMC Publishing Co., Ltd., compiled by Yoneho Tabata/edited by RadTech Japan).

On the other hand, for the case where the cation-polymerizable composition is applied to the photo-curable ink, it is allowable to apply a photo-acid generator as the initiator. Available photo-acid generators typically include chemical amplification photo-resist and compounds used for photo-cationic polymerization. The compounds applicable herein are such as those described in "Imejingu-Yo Yuki Zairyo (Organic Materials for Imaging)", edited by The Japanese Research Association for Organic Electronics Materials, published by Bun-Shin Shuppan K. K., 1993, p.187–192.

For the case where the cation polymerization compound is applied to the photo-curable ink, compounds suitable for the initiator can be classified into five following groups.

A first group include aromatic onium salts which comprise cations such as diazonium, ammonium, iodonium, sulfonium and phosphonium cations typically expressed by formulae (1) to (14), and anions such as $B(C_6F_5)_4^-$, $PF_6^-$, $AsF_6^-$, $SbF_6^-$ and $CF_3SO_3^-$. As the initiators belonging to the first group, those having borate as a counter ion is particularly preferable in view of exhibiting an excellent acid generating ability.

[Chemical formula 1]

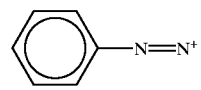

(1)

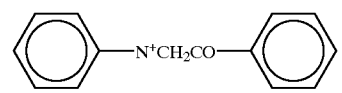

(2)

(3)

(4)

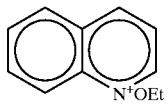

(5)

A second group include sulfonated compounds typically expressed by formulae (15) to (25) These compounds can generate sulfonic acid ion under UV irradiation.

A third group includes halogenated compounds typically expressed by formulae (26) to (32). These compounds can generate hydrogen halide under UV irradiation.

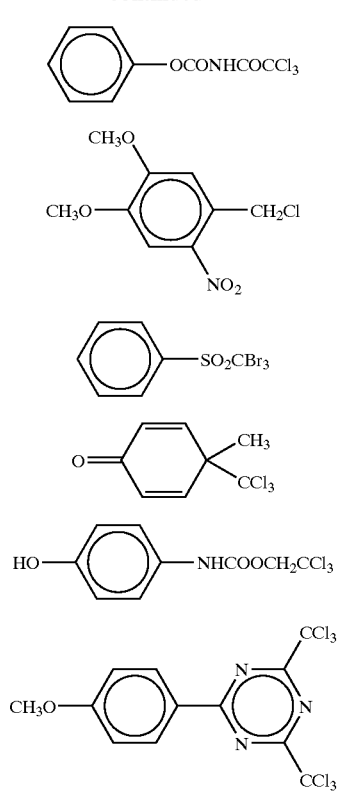

A fourth group includes iron-allene complexes typically expressed by formulae (33) and (34).

[Chemical formula 4]

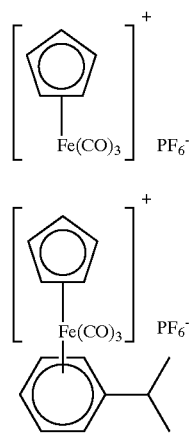

A fifth group includes titanocenes. "Titanocenes" is a general nomenclature for compounds having a molecular skeleton in which one or two cyclopentadienyl ligands are coordinated to a titanium atom. Specific examples include bis-cyclopentadienyl-Ti-dichloride, di-cyclopentadienyl-Ti-bisphenyl, di-cyclopentadienyl-Ti-bis-2,3,4,5,6-pentafluorophen-1-yl, di-cyclopentadienyl-Ti-bis-2,3,5,6-tetrafluorophen-1-yl, di-cyclopentadienyl-Ti-bis-2,4,6-trifluorophen-1-yl, di-cyclopentadienyl-Ti-bis-2,6-difluorophen-1-yl, di-cyclopentadienyl-Ti-bis-2,4-difluorophen-1-yl, di-methylcyclopentadienyl-Ti-bis-2,3,4,5,6-pentafluorophen-1-yl, di-methylcyclopentadienyl-Ti-bis-2,3,5,6-tetrafluorophen-1-yl, di-methylcyclopentadienyl-Ti-bis-2,4-difluorophen-1-yl, bis (cyclopentadienyl)-bis(2,6-difluoro-3-(pyr-1-yl)phenyl) titanium (IRUGACURE784: product of CIBA Specialty Chemicals, K. K.), while being not limited thereto.

The initiation auxiliary is a substance which acts as a sensitization dye for giving energy to the initiator and raising generation efficiency of radical or acid from the initiator through any mechanisms of electron donation, electron attraction, heat generation or the like under UV irradiation, and is used in combination with the initiator.

Publicly-known combinations of the initiator and initiation auxiliary applied to radical-polymerizable composition include a combination of peracid ester as the initiator with any initiation auxiliary of xanthene, thioxanthone dye, ketocoumarin and thiopyrylium salt; and a combination of onium salt such as diphenyliodonium salt as the initiator with thioxanthene dye as the initiation auxiliary.

For the case where titanocenes are applied to cation-polymerizable composition as the initiator, it is possible to apply an initiation auxiliary which can allow the titanocens to be sensitized from the visible radiation region to near-infrared region corresponding to lasers or LEDs, and examples of the initiation auxiliary include cyanine, phthalocyanine, merocyanine, porphyrin, spiro compounds, ferrocene, fluorene, fulgide, imidazole, perilene, phenazine, phenothiazine, polyene, azo compounds, diphenylmethane, triphenylmethane, polymethineacrydine, coumarin, ketocoumarin, quinacridone, indigo, stylyl, pyrylium compounds, pyromethene compounds, pyrazolotriazole compounds, benzothiazole compounds, barbituric acid derivatives, and thiobarbituric acid derivatives.

As the initiation auxiliary used in combination with titanocene, compounds described in European Patent No. 568,993, U.S. Pat. Nos. 4,508,811 and 5,227,227, and Japanese Laid-Open Patent Publication Nos. Tokukai 2001-125255 and Tokukai-hei 11-271969 are also applicable. Specific examples of combinations of titanocenes as the photo-polymerization initiator with initiation auxiliary include those described in Japanese Laid-Open Patent Publication Nos. Tokukai 2001-125255 and Tokukai-hei 11-271969.

The initiation auxiliary is used for the case where the initiator applied to the photo-curable ink does not have an absorbance which ensures sufficient absorption of UV radiation irradiated from the light irradiation section 23. That is, for the case where the initiator is selected considering strength of the cured ink dots and adhesiveness thereof on the recording medium P, but the initiator does not absorb UV radiation possibly emitted from the light emitting portion 231, application of the initiation auxiliary can successfully cure the ink dots. Application of the initiation auxiliary to the photo-curable ink as described in the above makes it possible to print high-quality, high-strength images corresponding to a variety of recording media and applications.

As for the initiation auxiliary, besides the compounds described in the above, it is also allowable to apply any substances which are publicly known to function as a sensitization dye in the literatures such as "Kobunshi Tenkazai no Kaihatsu Gijutsu (Technology of Developing Polymer Additives)", published by CMC Publishing Co., Ltd, compiled by Yasukazu Ohkatsu. It is to be noted that the initiation auxiliary can be assumed as a component which composes a part of the initiator.

In order to color the photo-curable ink, a color material is added to the photo-curable ink by dispersion as described in the above. Applicable color materials are such as those soluble or dispersible into the major component of the polymerizable composition, and pigment is preferable from the viewpoint of light resistance. While those enumerated below are applicable as the pigment, the pigment applicable to the present invention is by no means limited thereto:

C.I. Pigment Yellow-1, 3, 12, 13, 14, 17, 81, 83, 87, 95, 109, 42, 74, 128, 185;

C.I. Pigment Orange-16, 36, 38;

C.I. Pigment Red-5, 22, 38, 48:1, 48:2, 48:4, 49:1, 53:1, 57:1, 63:1, 144, 146, 185, 101, 2, 12, 9, 122, 184, 188;

C.I. Pigment Violet-19, 23;

C.I. Pigment Blue-15:1, 15:3, 15:4, 18, 60, 27, 29;

C.I. Pigment Green-7, 36;

C.I. Pigment White-6, 18, 21 and other organic white pigments; and

C.I. Pigment Black-7.

Amount of addition of the color material to be added to the photo-curable ink is determined considering coloring property or so after dispersion, where a preferable range is 0.1 to 15 wt %. The amount of addition of the color material less than 0.1 wt % raises a problem of insufficient coloring by the color material, and of degraded color reproducibility of images produced on the recording medium P. The amount of addition of the color material exceeding 15 wt % raises problems of delayed curing of the ink dots under UV irradiation, and of degraded image quality due to bleeding of the ink dots.

The pigment can be dispersed into the photo-curable ink using a ball mill, sand mill, attriter, roll mill, agitator, Henshel mixer, colloid mill, ultrasonic homogenizer, pearl mill, wet jet mill, paint shaker or the like.

It is also possible to add a dispersion aid to the photo-curable ink, in order to disperse the pigment in the photo-curable ink. Polymer dispersion aid is preferably used as the dispersion aid. Solsperse Series produced by Avecia KK is typically used as the polymer dispersion aid. It is also allowable to add a synergist as the dispersion auxiliary to the photo-curable ink corresponding to species of the pigments.

The dispersion aid and dispersion auxiliary are preferably added in an amount of 1 to 50 weight parts per 100 weight parts of the pigment. The amount of addition of the dispersion aid and dispersion auxiliary per 100 weight parts of the pigment of less than 1 weight part raises problems of non-uniform dispersion of the pigment in the photo-curable ink, and of considerable degradation in image quality produced on the recording medium P. On the other hand, the amount of addition of the dispersion aid and dispersion auxiliary per 100 weight parts of the pigment exceeding 50 weight parts raises a problem of insufficient coloring of the color material or delayed curing of the photo-curable ink after placed on the recording medium P.

Solvent or polymerizable composition is applied to a dispersion medium for dispersing the pigment into the photo-curable ink. Herein, it is preferable to disperse the pigment in the photo-curable ink only by the polymerizable composition in order to cure the photo-curable ink applicable to the present invention rapidly under UV irradiation and to prevent deterioration or odor of the photo-curable ink after the curing. It is also preferable to apply a monomer having a low viscosity for the polymerizable composition in order to disperse the pigment in the photo-curable ink without using any solvent.

In the dispersion of the pigment, average grain size of the pigment is preferably controlled within a range from 0.08 to 0.5 $\mu$m. The grain size of the pigment is measured by the light scattering method, and the average grain size is defined by histogram average ($D_{50}$). The average grain size of pigment less than 0.08 $\mu$m raises a problem of increase in the costs for the photo-curable ink. The average grain size of pigment exceeding 0.5 $\mu$m raises a problem of ruining of transparency of the photo-curable ink after placed on the recording medium P, or degradation of image quality due to delayed curing of the photo-curable ink under UV irradiation.

Maximum grain size of the pigment is preferably controlled within a range from 0.3 to 10 $\mu$m. The maximum grain size smaller than 0.3 $\mu$m raises a problem of increase in the costs for the photo-curable ink. The maximum grain size larger than 10 $\mu$m raises a problem that the photo-curable ink is more likely to clog in the nozzle. For these reasons, the maximum grain size of the pigment is more preferably controlled within a range from 0.3 to 3 $\mu$m.

The components contained in the photo-curable ink are by no means limited to those described in the above. For example, it is allowable to add a polymerization inhibitor in an amount of 200 to 20,000 ppm in the photo-curable ink, in order to prevent the photo-curable ink from being cured before ejected. In particular for the case where the photo-curable ink is prepared as having a high viscosity, and ejected under heating so as to lower the viscosity, it is preferable to add the polymerization inhibitor to the photo-curable ink in order to avoid clogging in the head due to thermal polymerization.

Besides the components described in the above, it is also allowable to optionally add surfactant; leveling additive; matting agent; and polyester-base resins, polyurethane-base resins, vinyl-base resins, acrylic resins, rubber-base resins and waxes for controlling the film properties, in the photo-curable ink. It is also effective to add a trace amount of organic solvent in the photo-curable ink, in order to improve contact adhesiveness between the recording medium P and the photo-curable ink. In this case, the addition is effective only within a range not causative of problems of solvent resistance or odor, where the amount of addition preferably falls within a range from 0.1 to 5 wt %, and more preferably from 0.1 to 3 wt %.

It is still also allowable to blend the photo-curable ink by using a long-life initiator and a cation-polymerizable monomer in combination, or to blend a hybrid-type, photo-curable ink by using a radical-polymerizable composition and a cation-polymerizable composition in combination, as a means for preventing lowering of the sensitivity of ink color materials due to shielding effect.

The method for forming the image on the recording medium P by using the ink-jet printer 1 according to the present invention will be explained, as follows.

The image is printed by ejecting the photo-curable ink to the recording medium P from the ink-jet heads 2, 2 and so on. At the time, when the ink-jet heads 2, 2 and so on are moved in the left direction shown in FIG. 2B on the recording medium P, by the carriage 21, the photo-curable ink is ejected to the recording medium P. When the photo-curable ink ejected from the ink-jet heads 2, 2 and so on, are placed on the recording medium P in order, the ink dots are formed. The ink dots are expanded on the recording medium P by leveling.

When ink-jet heads 2, 2 and so on eject the photo-curable ink therefrom, the light emitting section 231 emits and irradiates UV radiation to the ink dots. When the ink-jet heads 2, 2 and so on forms the ink dots, the carriage 21 moves so that the light irradiation section 23 is located above the ink dots. After the carriage 21 moves, when the galvanometer mirror 232a operates and deflects the optical path of the UV radiation, the ink dots are scanned with the UV radiation.

Herein, as described above, the timing and the period the galvanometer mirror 232a deflects UV radiation are determined within a range from 0.02 to 500 ms after the ink dots are formed so that the ink dots are expanded to the proper dot diameter by leveling, and cured. Further, the length in the "S" direction of the range of UV radiation irradiated when scanned by the galvanometer mirror 232a one time is determined so as to be substantially equal to the length in the "S" direction of the range to which the ink dots are formed when the ink is ejected from the ink-jet head 2 one time. Further, the luminance of the UV radiation irradiated from the light irradiation section 23 is determined to be 1000 mW/cm$^2$ or higher, so that the ink dots are cured rapidly.

The ejection of the photo-curable ink and the irradiation of UV radiation are done when the carriage 21 moves in the left direction shown in FIG. 2B. When the carriage 21 moves from the right end to the left end of the recording medium P, one step of printing images is done. Thereafter, when the recording medium P is carried by a proper distance in the "S" direction by the relative moving section, the carriage 21 returns to the right end of the recording medium P. Thereby, the next step of printing images is done. When the steps are done continuously, the desired images are printed on the recording medium P.

The example of the ink-jet printer 1 according to the above-described embodiment, will be explained, as follows.

In this example, a magenta ink MI1 and a cyan ink CI1 are prepared as described below, and are applied as the photo-curable inks. In the preparation of the photo-curable inks, pigments, dispersion aids and so forth are first blended according to the compositions below, and the mixtures are then kneaded and dispersed using a two-roll mill, to thereby obtain magenta pigment dispersion MP1 and cyan pigment dispersion CP1.

<Magenta pigment dispersion MP1>

| | |
|---|---|
| Pigment Violet 19 (pigment) | 70 weight parts |
| nonionic dispersion aid (dispersion aid) | 10 weight parts |
| phenoxypolyethylene glycol acrylate (polymerizable composition) | 20 weight parts |
| Sumilizer GS (polymerization inhibitor, product of Sumitomo Chemical Co., Ltd.) | 0.1 weight parts |

<Cyan pigment dispersion CP1>

| | |
|---|---|
| Pigment Blue 15:3 (pigment) | 70 weight parts |
| nonionic dispersion aid (dispersion aid) | 10 weight parts |
| phenoxypolyethylene glycol acrylate (polymerizable composition) | 20 weight parts |
| Sumilizer GS (polymerization inhibitor, product of Sumitomo Chemical Co., Ltd.) | 0.1 weight parts |

Using the above-described pigment dispersions MP1 and CP1, the individual photo-curable inks having specific colors are prepared by blending as shown in Table 1. In the blending of the photo-curable inks, all materials shown in Table 1, but excluding the pigment dispersion, are blended, and after a thorough dissolution is confirmed, the mixture is gradually added with the aforementioned pigment dispersion at 50° C., and the mixture is thoroughly stirred using a dissolver. Thus-blended material is pre-filtered through a 10-μm filter, and then filtered through a 0.8-μm filter to thereby remove particularly coarse grains.

TABLE 1

| | MP1 | CP1 | DPCA60 | TEGDA | PO-A | I907 | DETX |
|---|---|---|---|---|---|---|---|
| Magenta Ink MI1 | 4 | | 25 | 25 | 44 | 1.5 | 0.5 |
| Cyan Ink CI1 | | 3 | 25 | 25 | 45 | 1.5 | 0.5 |

The abbreviations in Table 1 denote the following materials:

DPCA60: KAYARAD DPCA, product of Nippon Kayaku Co., Ltd.
(caprolactam-modified dipentaerythritol hexaacrylate)

TEGDA: bis-Coat#335HP, product Osaka Organic Chemical Industry, Ltd.
(tetraethylene glycol diacrylate)

PO-A: light acrylate PO-A, product of Kyoeisha Chemical Co., Ltd.
(phenoxyethyl acrylate)

I907: initiator, Irgacure907, product of CIBA Specialty Chemicals, K.K.
(2-methyl-1-[4-(methylthio)phenyl]-2-morpholinopropane-1-one)

DETX: initiation auxiliary, diethylthioxanthone

In the aforementioned filtering process, a sufficient filtration speed is obtained without causing any pressure loss. Next, thus-filtered, photo-curable ink is placed in a reduced pressure under heating and stirring at 50° C. in order to remove any dissolved air and water, and the resultant ink is subjected to image printing. Thus-prepared, photo-curable ink is found to have a viscosity at 25° C. of 12 to 22 mPa·s, a surface tension of 24 to 30 mN/m, an average grain size of pigment of 0.08 to 0.3 μm, and a water content of 0.7 to 1.2%.

The images are printed on the recording medium P, by using the photo-curable ink prepared as described above. A polyethylene terephthalate film is applied to the recording medium P on which the images are printed. The ink-jet head 2 applied to the ink-jet printer 1 used for printing images has 256 nozzles arranged on a line at a nozzle pitch of 360 dpi. Each nozzle has a diameter of 23 μm, and the photo-curable ink of 8 pl is ejected from each nozzle. The carriage 21 having the ink-jet heads 2, 2 and so on scans recording medium P in the A direction at 0.8 m/s.

A high-output pulse UV laser having an oscillating wavelength of 355 nm is applied to the light emitting section 231 of the light irradiation section 23. The beam diameter of the laser beam emitted as UV radiation from the light emitting section 231 is 3.5 mm, and the instantaneous luminance of the laser beam is 30 W/cm$^2$ at the exposure of the pulse light (the average luminance is 24 mW/cm$^2$)

The galvanometer mirror 232a is provided at a position apart from the nozzle of the ink-jet head 2 rightward in the A direction shown in FIG. 2A, by 16 mm. Further, the timing or the period of operating the galvanometer mirror 232a is determined so that the laser beam is irradiated to the range to which the ink dots are formed after 20 ms since the photo-curable ink is placed on the recording medium P, and the range is scanned by the laser beam for 7 ms.

The image is printed on the recording medium P by carrying the carriage 21 in the "A" direction and carrying the recording medium P by the shorter distance than the nozzle pitch, four times, continuously, for every range, so as to form the image having the dot density of 720 dpi on the recording medium P.

The images are printed on the recording medium P, by performing the ejection of the magenta ink MI1 and the cyan ink CI1 from the ink-jet heads 2, 2 and so on, and the scanning with the laser beam, continuously. As a result, it is confirmed that the ink dots on the recording medium P are cured without bleeding. The reason is that the high concentrated reactive species are generated by the initiator added in the magenta ink MI1 and the cyan ink CI1, and the polymerizable composition is changed to the polymer compound rapidly before inhibited by oxygen in the air, by irradiating the UV radiation having high luminance of 30 W/cm$^2$ to the ink dots.

According to the above-described example, it is possible to confirm that the ink-jet printer 1 according to the first embodiment, can reduce the bleeding of the photo-curable ink effectively, and form high-quality images on the recording medium P.

As described above, when the UV radiation is rapidly irradiated to the range on which the ink dots are formed by ejecting the ink from the ink-jet heads 2, 2 and so on, one time, it is possible to prevent the ink dots from bleeding on the recording medium. The above-described UV radiation is emitted from the light emitting section 231 having a device such as a laser or a LED, and irradiated to the above-described ink dots by scanning. Because the UV radiation emitted from the device is condensed and changed to the parallel rays easily, it is possible to irradiate the UV radiation to the ink dots on the recording medium P as laser beam having high luminance. Therefore, it is possible to cure the ink dots rapidly. Accordingly, when the ink is exposed properly by the laser beam, it is possible to expose the ink at the extremely high luminance. As a result, it is possible to reduce the amount of addition of the expensive initiator, and reduce the cost of the ink.

Further, it is possible to easily prepare the compact and light scanning section 232 for scanning with UV radiation emitted from the light emitting section 231. Therefore, if the composition elements are mounted on the carriage 21, it is possible to prevent the carriage from bulking or begin heavier. Accordingly, it is possible to easily realize both the rapid irradiation of UV radiation to the ink dots and the scanning of the ink dots by the carriage 21 effectively. As a result, it is possible to prepare the ink-jet printer 1 which can print high-quality images without the bleeding of the photo-curable ink, effectively. Further, it is possible to prepare the compact ink-jet printer 1 as described above.

Further, because the energy radiation emitted from the light emitting section 231 is UV radiation having a wavelength of 250 nm or longer, it is possible to apply a well-known device which can be got easily, to the light emitting section 231. Accordingly, it is possible to prepare the ink-jet printer 1 easily, at low cost. In addition, because the photo-curable ink corresponding to UV radiation having a wavelength of 250 nm or longer, can be made of well-known materials which can be got easily, it is possible to prepare the ink applied to the ink-jet printer 1 at low cost.

Further, because the direction in which the scanning section 232 scans the ink dots by UV radiation is substantially parallel to the direction in which the nozzles are arranged, it is possible to reduce the difference of time between ink dots, the time after each ink dot is formed on the recording medium P until it is irradiated with UV radiation, and to control the diameter or the shape of the ink dot uniformly. As a result, it is possible to print high-quality images on the printing medium P.

The ink-jet printer 1 according to the embodiment is not limited to the above-described one. The light irradiation section 23 may be provided apart from the carriage 21.

For example, one light emitting section 231 may be provided at a position apart from the carriage 21, as shown in FIG. 5A, and irradiate UV radiation to each galvanometer mirror 232a. In case the light emitting section 23s has a bulky structure like a gas laser oscillator, when the light emitting section 23s may be provided as shown in FIG. 5B, it is possible to lighten the carriage 21.

[Second Embodiment]

Next, the ink-jet printer 1 according to the second embodiment will be explained as follows. In the following explanation, it is omitted to explain the common section to one of the ink-jet printer 1 according to the first embodiment, in detail.

The ink-jet printer 1 according to the second embodiment, prints the images according to an external surface drum scanning system. The ink-jet printer 1 comprises the printing section 20, the light irradiation section 23, a relative moving section 70 and so on.

The printing section 20 comprises the ink-jet head 2, the carriage 21 and so on. The carriage 21 moves in the direction of the arrow "A" shown in FIGS. 3A and 3B with holding the ink-jet heads 2, 2 and so on, and the scanning section 232 of the light irradiation section 23, and scans on the recording medium P.

A plurality of ink-jet heads 2, 2 and so on are arranged in the "A" direction shown in FIG. 3A, so as to correspond to colors (Herein, yellow, magenta, cyan) of ink ejected to the recording medium P.

A plurality of nozzles for ejecting the photo-curable ink and forming the ink dots on the recording medium P are provided on the nozzle surface 2a which is a surface to the recording medium P. The nozzles are arranged in a condition that they can form a substantially parallel line to the direction of the arrow "A" shown in FIG. 3A, when contained in the carriage 21, and they can form the ink dots on the recording medium P when ejecting photo-curable ink of the length "1" shown in FIG. 3A one time. Preferably, the distance between the nozzles arranged is determined so as to form the ink dots having the density of 300 dpi (dots per inch) or higher on the recording medium P, by ejecting the ink one time, in order to form clear images on the recording medium P effectively.

The light irradiation section (energy radiation irradiation section) 23 comprises the light emitting section 231, the scanning section 232, the collimator (which is not shown in figures) and so on. Further, the light irradiation section 23 is provided near the ink-jet heads 2, 2 and so on, in the vertical direction to the "A" direction. When the light irradiation section 23 scans the range of the recording medium P, on which the ink dots are formed, with the UV radiation, the ink dots are cured.

The light emitting section 231 and the collimator are arranged at a position apart from the carriage 21. The light emitting section 231 comprises a well-known light emitting device which is a laser element such as a LED, a semiconductor laser element or the like. Preferably, the wavelength of UV radiation emitted from the light emitting section 231 is within a range from 250 to 450 nm. Preferably, the collimator is determined so as to condense the UV radiation and change it to the parallel rays so that the luminance of the energy of the UV radiation emitted from the light emitting section 231 is 1000 mW/M$^2$ or higher when the UV radiation reaches the recording medium P.

The scanning section 232 functions also as the irradiation control section. The scanning section 232 comprises the galvanometer mirror 232a and a motor which is not shown in figures. The galvanometer mirror 232a periodically changes the angle against the light emitting section 231 by the motor. Thereby, the galvanometer mirror 232a deflects the optical path of the UV radiation emitted from the light emitting section 231 periodically, and scans on the recording medium P.

The length (the length in the "A" direction shown in FIG. 3A) of the range on the recording medium P to which the UV radiation is irradiated from the light irradiation section 23, is determined so as to be substantially equal to "1" which is the length in the "A" direction, of the range on the recording medium P on which the ink dots are formed when the ink is ejected from the ink-jet heads 2, 2 and so on one time. Because the length of the above-described range is determined as described above, it is possible to irradiate the UV radiation so as to correspond to the recording width of the ink-jet heads 2, 2 and so on.

The period and the timing of the deflection of the UV radiation by the galvanometer mirror 232a is determined properly in consideration of the dot diameter required for the ink dot, the moving speed of the carriage 21, the property of the photo-curable ink or the like, so that the time after the photo-curable ink ejected from the ink-jet head 2 is placed on the recording medium P until it is irradiated with the UV radiation is within a range from 0.02 to 500 ms.

The relative moving section 70 comprises a drum 71, a driving rotating section (which is not shown in figures) and so on. The drum 71 is formed in a cylindrical shape. The recording medium P is attached on an external surface of the drum 71. The driving rotating section rotates the drum 71 in the direction (S direction) of the arrow "S" show in FIG. 3A. Thereby, the recording medium P relatively moves to the ink-jet heads 2, 2 and so on.

Preferably, the speed that the driving rotating section rotates the drum 71 is determined so that the speed that the recording medium P relatively moves to the ink-jet heads 2, 2 and so on is within a range from 0.3 to 200 m/s. The speed lower than 0.3 m/s causes a problem that the efficiency of printing the image on the recording medium P is lowered. On the other hand, the speed higher than 200 m/s causes a problem that it is required to prepare the large-size relative moving section, and it is impossible to prepare the compact ink-jet printer 1.

The photo-curable ink substantially common to one explained in the first embodiment is applied to the above-described ink-jet printer 1.

The method for printing images by the ink-jet printer 1 according to the second embodiment will be explained as follows.

The images are printed by ejecting the photo-curable ink from the ink-jet heads 2, 2 and so on to the recording medium P. When the photo-curable ink ejected from the ink-jet heads 2, 2 and so on is placed on the recording medium P in order, the ink dots are formed.

After the photo-curable ink is ejected from the ink-jet heads 2, 2 and so on, the light emitting section 231 emits and irradiates the UV radiation to the ink. When the ink dots based on the ink ejected from the ink-jet heads 2, 2 and so on are formed, the driving rotating section rotates in the "S" direction so that the light irradiation section 23 is located above the ink dots. When the recording medium P is moved, the galvanometer mirror 232a operates and deflects the optical path of the UV radiation. Thereby, the ink dots are scanned so that the UV radiation is irradiated after 0.02 to 500 ms since the photo-curable ink is placed on the recording medium P. Therefore, the ink dots forming the images on the recording medium P are expanded properly (with the proper diameter) and cured.

Herein, the length in the "A" direction of the range to which the UV radiation is irradiated when the galvanometer mirror 232a scans one time, is determined so as to be substantial equal to the length in the "A" direction of the range on which the ink dots are formed when the ink is ejected from the ink-jet heads 2, 2 and so one time. Further, the luminance of the UV radiation irradiated from the light irradiation section 23 is determined to be 1000 mW/cm$^2$ or higher so that the ink dots are cured rapidly.

The scanning by the carriage 21 moving in the "A" direction and the scanning by the drum rotating in the "S" direction are performed when the ink dots ejected from the ink-jet heads 2, 2 and so on are formed and the UV radiation is irradiated from the light irradiation section 23. Because the scanning by the drum 71 rotating and the scanning by the carriage 21 moving are combined and performed properly, it is possible to scan the whole recording medium P and print the desired images on the recording medium P.

As described above, in case the present invention is applied to the ink-jet printer 1 according to the external surface drum scanning system, it is possible to prevent the ink dots formed on the recording medium from bleeding, control the dot diameter, and cure the ink dots rapidly. Further, it is possible to cure the ink dots without lowering the efficiency of the ejection of the photo-curable ink from the ink-jet heads 2, 2 and so on. Furthermore, it is possible to prepare the compact ink-jet printer 1 as described above. Accordingly, it is possible to prepare the compact ink-jet printer 1 which can print high-quality images without the bleeding of the photo-curable ink, efficiently.

[Third Embodiment]

Next, the ink-jet printer 1 according to the third embodiment will be explained as follows. The ink-jet printer 1 according to the third embodiment prints images according to the line recording system. The ink-jet printer 1 comprises the printing section 20, the light irradiation section 23, the relative moving section (which is not shown in figures) and so on.

Figure 4A:
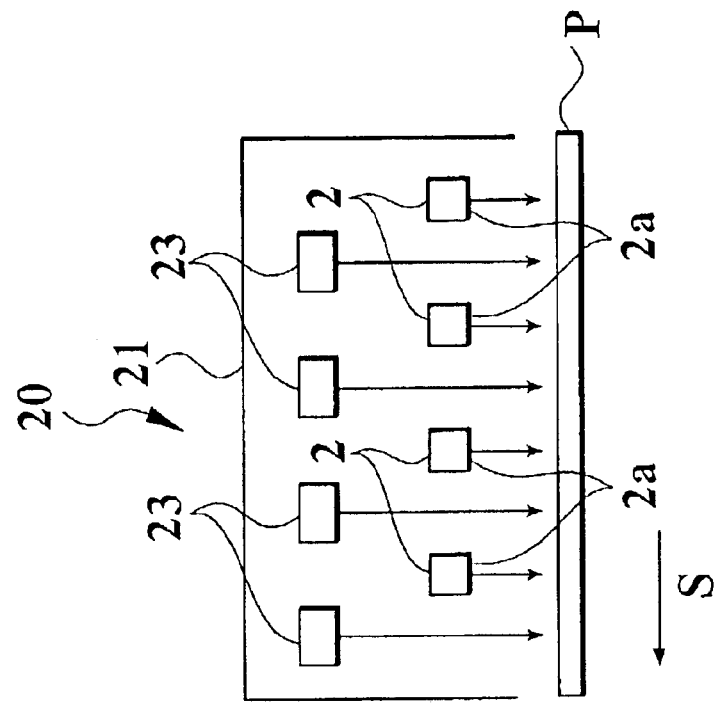
FIG. 4A is a vertical front view of the main part of the ink-jet printer 1 according to a third embodiment.
Figure 4B:
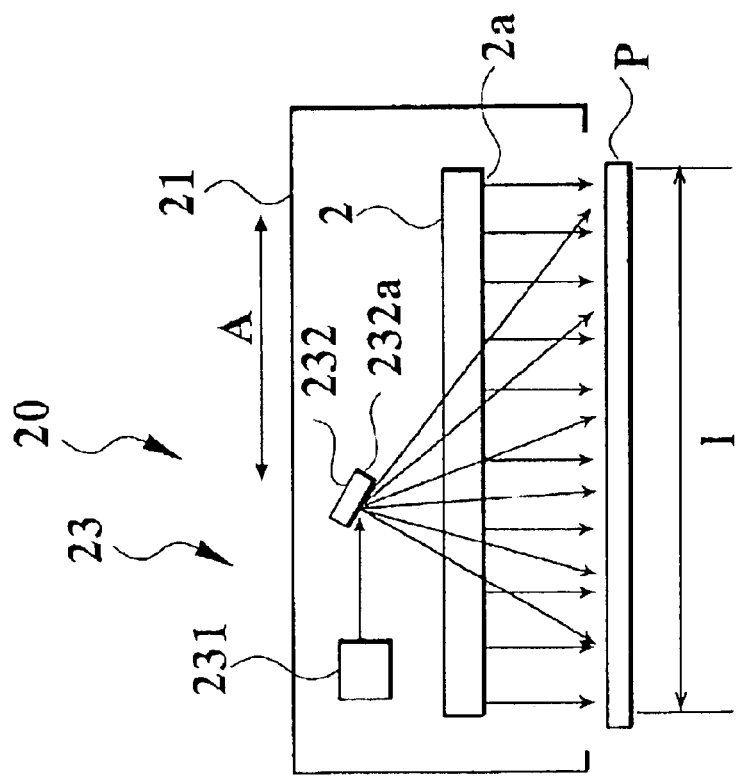
FIG. 4B is a vertical side view of the main part.

The printing section 20 comprises the ink-jet head 2, the carriage 21 and so on, as shown in FIGS. 4A and 4B. The carriage 21 is fixed on the recording medium P with holding the ink-jet heads 2, 2 and so on and the light irradiation section 23.

The ink-jet heads 2, 2 and so on are formed as a line head. That is, nozzles of the length "1" which is the substantially same as or longer than one of the recording medium P in the A direction, are provided on the nozzle surface 2a of the ink-jet head 2. Further, the nozzles are arranged in a sub-stantial parallel line to the "A" direction. When the nozzles are provided as described above, it is possible to form the ink dots arranged at one row or a plurality rows of the length "1" in the "A" direction of the recording medium P, at the substantially same time, without moving the carriage 21.

A plurality of ink-jet heads 2, 2 and so on are arranged, fixed and provided in the "S" direction shown in FIG. 4B, so as to correspond to colors (Herein, yellow, magenta, cyan, black) of the ink ejected to the recording medium P.

Preferably, the distance between the nozzles provided is determined so as to form the ink dots having the density of 300 dpi (dots per inch) or higher on the recording medium P by ejecting the ink one time, in order to form clear images on the recording medium P efficiently. The reason is that the light is not always exposed to only the range on which the ink is placed, according to the laser beam irradiation method applied to the present invention. For example, when the nozzle pitch is 150 dpi, in order to obtain the image having 600 dpi, it is necessary to scan at least four times. In the case, the efficiency of the light irradiation is ¼. When the nozzle pitch is 300 dpi, the efficiency is ½. Therefore, the nozzle pitch of 300 dpi is more efficient than the nozzle pitch 150 dpi. In order to obtain high fine images light-irradiation-efficiently, it is preferable to use the head having the nozzle pitch of 300 dpi or higher.

The light irradiation section (energy radiation irradiation section) 23 comprises the light emitting section 231, the scanning section 232, the collimator (which is not shown in figures) and so on. The light irradiation sections 23, 23 and so on and the ink-jet heads 2, 2 and so on are arranged and fixed by turns, in the "S" direction as shown in FIG. 4B. The light irradiation section 23 irradiates the UV radiation to the range on which the ink dots are formed, and cures the ink dots.

The light emitting section 231 comprises a well-known light emitting device which is a laser element such as a LED, a semiconductor laser element or the like. Preferably, the wave length of the UV radiation emitted from the light emitting section 231 is within a range from 250 to 450 nm. Further, preferably, the collimator is determined so as to condense the UV radiation emitter from the light emitting section 231 and change it to parallel rays, so that luminance of the UV radiation is 1000 mW/m$^2$ or higher when the UV radiation reaches the recording medium P.

The scanning section 232 function also as the irradiation control section. The scanning section 232 comprises the galvanometer mirror 232a and a motor which is not shown in figures. The galvanometer mirror 232a changes the angle against the light emitting section 231 by the motor, periodically, and changes the optical path of the UV radiation emitted from the light emitting section 231. Thereby, the range on the recording medium P is scanned by the UV radiation.

The length (the length in the "A" direction shown in FIG. 4A) of the range on the recording medium P, to which the UV radiation is irradiated from the light emitting section 23 is determined so as to be the substantially same as the length "1" of the range in the "A" direction on the recording medium P on which the ink dots are formed when the ink-jet heads 2, 2 and so on eject ink one time. Therefore, the range on the recording medium P to which the UV radiation is irradiated is determined so as to correspond to the recording width of the ink-jet heads 2.

The period and the timing of the deflection of the UV radiation by the galvanometer mirror 232a is determined properly in consideration of the dot diameter required for the ink dot, the moving speed of the carriage 21, the property of the photo-curable ink or the like, so that the time after the photo-curable ink ejected from the ink-jet heads 2 is placed on the recording medium P until it is irradiated with the UV radiation is within a range from 0.02 to 500 ms.

The relative moving section carries the recording medium P in the "S" direction vertical to the "A" direction which is the direction of the nozzles arranged in the ink-jet heads 2, 2 and so on which is a line head. Thereby, the relative moving section moves the recording medium P to the ink-jet heads 2, 2 and so relatively. Preferably, the carrying speed of the recording medium P is determined to be within a range from 0.3 to 5 m/s. The speed lower than 0.3 m/s causes a problem that the efficiency of printing the images on the recording medium P is lowered. On the other hand, the speed higher than 5 m/s causes a problem that it is required to prepare the large-sized relative moving section, and it is impossible to prepare the compact ink-jet printer 1.

The photo-curable ink substantially common to one explained in the first embodiment is applied to the above-described ink-jet printer 1.

Next, the method for printing images by the ink-jet printer 1 according to the third embodiment will be explained as follows.

The images are printed by ejecting the photo-curable ink from the ink-jet heads 2, 2 and so on to the recording medium P. The photo-curable ink ejected from the ink-jet heads 2, 2 and so on is placed on the recording medium P, in order. Therefore, one row of ink dots are formed in the "A" direction of the range on the recording medium P on which the images can be printed.

When the photo-curable ink is ejected from the ink-jet heads 2, 2 and so on, it is irradiated with the UV radiation irradiated from the light emitting sections 231, 231 and so on. When the ink dots ejected from the ink-jet heads 2, 2 and so are formed, the driving rotating section drives in the "S" direction so as to locate the light irradiation section 23 above the ink dots.

When the galvanometer mirror 232a operates and deflects the optical path of the UV radiation with moving the recording medium P, the UV radiation is irradiated to the ink after 0.02 to 500 ms since the photo-curable ink is placed on the recording medium P. Therefore, the ink dots are scanned. Accordingly, the ink dots forming images on the recording medium P are expanded properly (with a proper dot diameter), and cured.

Herein, the length in the "A" direction of the range to which the galvanometer mirror 232a is scanned with the UV radiation one time, is determined so as to be the substantially same as the length "1" in the "A" direction of the range on which the ink dots are formed when the ink is ejected from the ink-jet heads 2, 2 and so on one time. Further, the luminance of the UV radiation irradiated from the light irradiation section 23 is determined to be 1000 mW/cm$^2$ or higher so that the ink dots are cured rapidly.

Even when the ink dots ejected from the ink-jet heads 2, 2 and so are formed and irradiated with the UV radiation emitted from the light irradiation section 23, the carriage 21 moves in the "S" direction by a proper distance. Thereby, the scanning is performed in the "S" direction. Therefore, when performing the scanning continuously, it is possible to print the desired images on the recording medium P.

Next, an example of printing images on the recording medium P by the ink-jet printer 1 according to the embodiment will be explained as follows.

In this example, magenta ink MI2 and cyan ink CI2 are prepared as described below, and are applied as the photo-curable inks. In the preparation of the photo-curable inks, pigments, dispersion aids and so forth are first blended according to the compositions below, and the mixtures are then kneaded and dispersed using a two-roll mill, to thereby obtain magenta pigment dispersion MP2 and cyan pigment dispersion CP2.

<Magenta pigment dispersion M2>

| | |
|---|---|
| Pigment Violet 19 (pigment) | 70 weight parts |
| nonionic dispersion aid (dispersion aid) | 10 weight parts |
| di [1-ethyl-(3-oxetanyl)]methyl ether (polymerizable composition; OXT-221, product of Toagosei Co., Ltd.) | 20 weight parts |

<Cyan pigment dispersion C2>

| | |
|---|---|
| Pigment Blue 15:3 (pigment) | 70 weight parts |
| nonionic dispersion aid (dispersion aid) | 10 weight parts |
| di [1-ethyl-(3-oxetanyl)]methyl ether | 20 weight parts |

-continued (polymerizable composition; OXT-221,
product of Toagosei Co., Ltd.)

Using thus-prepared pigment dispersions, the individual photo-curable inks having specific colors are prepared by blending as shown in Table 2 similarly to as described in the example of the first embodiment. Thus-prepared, photo-curable inks are found to have a viscosity at 25° C. of 15 to 30 mPa·s, a surface tension of 30 to 38 mN/m, an average grain size of pigment of 0.08 to 0.2 μm, and a water content of 0.3 to 0.7%.

TABLE 2

|  | MP2 | CP2 | OXT-221 | 2021P | SP152 | Anthracene |
|---|---|---|---|---|---|---|
| Magenta Ink MI2 | 4 |  | 25 | 28.5 | 1.3 | 0.2 |
| Cyan Ink CI2 |  | 3 | 25 | 28.5 | 1.3 | 0.2 |

The abbreviations in Table 2 denote the following materials:

OXT-221: polymerizable composition, OXT-221, product of Toagosei Co., Ltd.
(di[1-ethyl-(3-oxetanyl)]methyl ether)

2021P: polymerizable composition, Celloxide 2021P, product of Daicel Chemical Industries, Ltd.
(3,4-epoxycyclohexylmethyl-3,4-epoxycyclohexane carboxylate)

SP152: initiator, SP152, product of Asahi Denka Co., Ltd.
(triphenylsulfonium-salt-based, photo-acid generator)
anthracene: initiation auxiliary The images are printed by using the photo-curable ink prepared as described above, according to the line recording system. A polyethylene terephthalate film is applied to the recording medium P.

The ink-jet head 2 applied to the ink-jet printer 1 has 256 nozzles arranged on a line at a nozzle pitch of 360 dpi. Each nozzle has a diameter of 23 μm, and the photo-curable ink of 28 pl is ejected from each nozzle when a piezo element operates.

A UV laser (continuous wave oscillation type) having an oscillating wavelength of 266 nm is applied to the light emitting section 231. The collimator is determined so that the diameter of the laser beam is 3.5 mm, and the luminance of the laser beam is 3 W/cm$^2$.

The laser beam emitted from the light emitting section 231, as UV radiation is irradiated on the recording medium P in the "A" direction shown in FIG. 4A, by the galvanometer mirror 232a. The galvanometer mirror 232a is provided at a distance of 600 mm in the "A" direction from the corresponding ink-jet head 2 which is provided at the right side in FIG. 4B. The timing and the period of the deflection of the laser beam by the galvanometer mirror 232a is determined so that the laser beam is irradiated to the range on which the ink dots are formed, for 1.75 ms, after 30 ms since the ink dots are formed on the recording medium P. The carrying speed of the recording medium P by the relative moving section is determined to be 2 m/s.

The images are printed on the recording medium P by performing the ejection of the magenta ink MI2 and the cyan ink CI2 from the ink-jet heads 2, 2 and so on, and the scanning with the laser beam, continuously, in the above-described condition. As a result, it is confirmed that the ink dots on the recording medium P are cured without bleeding. That is, the magenta ink MI2 and the cyan ink CI2 are cured rapidly for the same reasons as those according to the first embodiment.

According to the above-described example, it is confirmed that the ink-jet printer 1 according to the third embodiment can reduce the bleeding of the photo-curable ink effectively and can form high-quality images on the recording medium P.

As described above, in case of applying the present invention to the ink-jet printer 1 of the line recording system, it is possible to prevent the ink dots formed on the recording medium P from bleeding, and cure the ink dots rapidly with controlling the dot diameter of the ink dots. Further, it is possible to cure the ink dots without lowering the efficiency of ejecting the photo-curable ink from the ink-jet heads 2, 2 and so on. Further, it is possible to prepare the compact ink-jet printer 1. Accordingly, it is possible to prepare the compact ink-jet printer 1 which can print high-quality images without the bleeding of the photo-curable ink, efficiently.

The ink-jet printer 1 according to the embodiment, is not limited to have the ink-jet heads 2, 2 and so on fixed thereto. The ink-jet heads 2, 2 and so on may be provided so as to move in a shorter distance than the pitch of the nozzles. In the case, when the carriage 21 moves in a distance which is ½ or ⅓ of the nozzle pitch, it is possible to print high-quality images having a high resolution.

Figure 6:
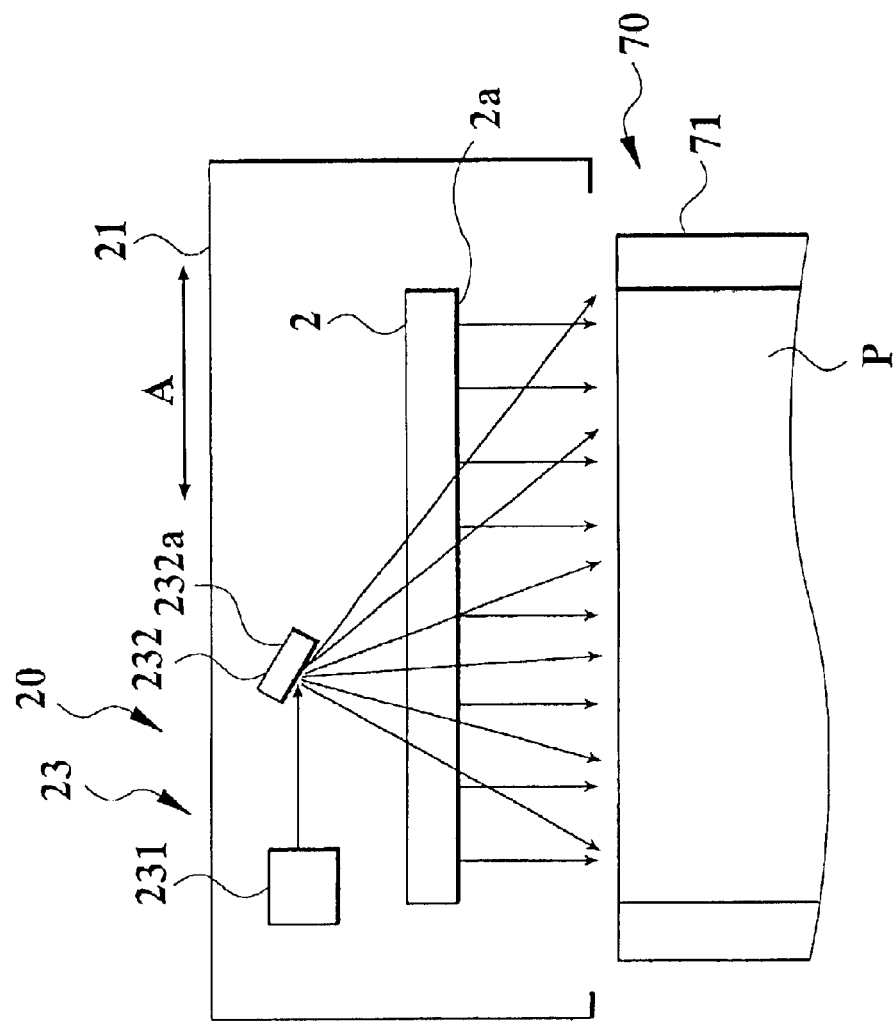
FIG. 6 is a vertical front view of the main part of the ink-jet printer 1 of another example of the third embodiment.

The ink-jet printer 1 according to the embodiment may have a combination structure of the line head recording system and the external surface drum scanning system. That is, as shown in FIG. 6, the recording width of the ink-jet head 2 may be the substantially same as the width (in the "A" direction shown in FIG. 5) of the range of the recording medium P on which images can be printed. Further, the relative moving section 70 may be provided at the drum 71, and the recording medium P may be attached on the external surface of the drum 71.

The image recording method and apparatus of the present invention are not limited to the above-described method and apparatus.

The energy radiation irradiated to the ink dots by scanning is not limited to UV radiation having a wavelength of 250 nm or longer.

For example, the image recording method and apparatus of the present invention may use energy radiation such as UV radiation, visible radiation, infrared radiation, electron beam, X rays or the like, having a wavelength shorter than 250 nm, and cure ink dots.

For example, it is allowable to use infrared radiation having a wavelength of 800 nm or longer as the energy radiation in the image recording method and apparatus of the present invention. In this case, it is possible to apply an energy radiation curable ink having a property to be cured based on a thermal reaction. Applicable examples of the energy radiation curable ink include those using, as a thermal reaction initiator, peroxide compounds such as benzoyl peroxide, diazo compounds (heat radical generator) such as AIBN, and compounds in common with those the photo-acid generator exemplified in the first example. It is also allowable to use an initiation auxiliary which strongly tend to radiate heat after absorbing near-infrared radiation, such as cyanine dye, squarylium dye, polymethine dye, carbon black and titanium black. As described above, in case infrared radiation having a wavelength of 800 nm or longer is applied as the energy radiation, it is possible to apply a well-known device which can be got easily to the light emitting section 231, and to prepare the energy radiation curable ink of well-known materials which can be got easily.

Further, it is allowable to use visible radiation having a wavelength of 450 nm or shorter as the energy radiation. The photo-curable ink corresponding to the visible radiation causes a problem that the initiator or the initiation auxiliary emits coloring and inhibits the color tone of the photo-curable ink. However, in the photo-curable ink having a strong color tone like black, the coloring is not affected. Therefore, in the ink-jet printer 1 for printing black and white images, it is possible to apply the radiation having a wavelength of 450 nm or shorter as the energy radiation. In the case, it is possible to apply a well-known device which can be got easily to the light emitting section 231, and to prepare the energy radiation curable ink of well-known materials which can be got easily.

The embodiment of the image recording apparatus of the present invention is not limited to the ink-jet printer 1 described in each embodiment.

For example, the light emitting section 231 which is one of elements of the light irradiation section 23 may be provided in the inside of the carriage 21, or may be provided apart from the carriage 21.

Further, the scanning section 232 and the irradiation control section are not limited to the structure comprising the galvanometer mirror 232a, and may deflect the energy radiation by a polygon mirror. Further, the scanning section 232 and the irradiation control section may apply an optical element as the lens or the like. Furthermore, the scanning section 232 and the irradiation control section may be separated from each other.

Further, one light emitting section 231 may be provided for one ink-jet printer, and may irradiate energy radiation to a plurality of scanning sections 232, 232 and so on. As described above, the specific condition of the light irradiation section 23 is determined based on the design, properly, in consideration of not only the efficiency regarding the ink dot curing, but also the efficiency of the whole image printing, the shape of the ink-jet printer 1 or the like.

According to the present invention, because energy radiation is irradiated to ink dots formed on the recording medium rapidly, it is possible to prevent the ink from bleeding and print high-quality images. Further, because the effect can be obtained by the energy radiation irradiation section which is compact, it is possible to print high-quality images and to prepare the compact image printing apparatus which can print high-quality images.

The entire disclosure of Japanese Patent Application No. Tokugan 2002-133991 filed on May 9, 2002 including specification, claims, drawings and summary are incorporated herein by reference in its entirety.

What is claimed is:

1. An image recording method for ejecting and placing energy radiation curable ink which is cured when irradiated with energy radiation according to an ink-jet recording method, irradiating the energy radiation on a recording medium on which ink dots are formed, and printing an image, the method comprising:

ejecting the energy radiation curable ink to the recording medium from a plurality of nozzles provided for an ink-jet head, moving the recording medium to the ink-jet head relatively, and forming the image;

condensing the energy radiation to be an approximately parallel ray; and controlling a range to which the energy radiation is irradiated, so as to correspond to a recording width of the ink-jet head, wherein the energy radiation curable ink comprises a polymerizable composition to form a polymer compound through polymerization reaction, an initiator for initiating the polymerization reaction when irradiated with the energy radiation, and a color material for coloring the energy radiation curable ink; the initiator initiates the polymerization reaction when irradiated with the energy radiation having a wavelength which is within a range from 250 to 450 nm or 800 nm or longer; and the energy radiation curable ink has a viscosity of 6 to 500 mPa·s at 25° C.

2. The method of claim 1, wherein the energy radiation is emitted from at least one of a laser device and a LED, and the irradiating the energy radiation is performed by scanning the recording medium with the energy radiation.

3. The method of claim 2, wherein the nozzles are arranged in a line, and the scanning the recording medium with the energy radiation is performed in a substantially parallel direction to a direction in which the nozzles are arranged.

4. The method of claim 2, wherein a time after the energy radiation curable ink is placed on the recording medium until the ink dots are scanned and irradiated with the energy radiation is within a range from 0.02 to 500 ms.

5. The method of claim 1, wherein the moving the recording medium to the ink-jet head relatively includes moving the recording medium to the ink-jet head relatively by rotating a cylindrical drum having an external surface on which the recording medium is attached.

6. The method of claim 1, wherein the ink-jet head is a line head, and the moving the recording medium to the ink-jet head relatively includes moving the recording medium to the ink-jet head relatively by carrying the recording medium in a vertical direction to the line head.

7. The method of claim 1, wherein the nozzles are arranged so as to form the ink dots having a density of 300 dpi or higher on the recording medium when irradiating the energy radiation curable ink therefrom one time.

8. The method of claim 1, wherein a wavelength of the energy radiation is within a range from 250 to 450 nm or 800 nm or longer.

9. The method of claim 1, wherein a speed of moving the recording medium to the ink-jet head relatively is within a range from 0.3 to 200 m/s.

10. The method of claim 1, wherein amount of addition of the initiator is within a range from 0.1 to 3 wt %.

11. The method of claim 1, wherein the energy radiation curable ink further comprises an initiation auxiliary for giving excitation energy to the initiator when irradiated with the energy radiation, and making the initiator initiate the polymerization reaction.

12. The method of claim 1, wherein a collimator is used for condensing the energy radiation to be an approximately parallel ray.

13. An image recording method for ejecting and placing energy radiation curable ink which is cured when irradiated with energy radiation according to an ink-jet recording method, irradiating the energy radiation on a recording medium on which ink dots are formed, and printing an image, the method comprising:

ejecting the energy radiation curable ink to the recording medium from a plurality of nozzles provide for an ink-jet head, moving the recording medium to the ink-jet head relatively, and forming the image;

condensing the energy radiation to be an approximately parallel ray; and controlling a range to which the energy radiation is irradiated, so as to correspond to a recording width of the ink-jet head, wherein a luminance of the energy radiation irradiated to the recording medium is 1000 mW/cm² or higher.

14. An image recording apparatus for ejecting and placing energy radiation curable ink which is cured when irradiated with energy radiation according to an ink-jet recording method, irradiating the energy radiation on a recording medium on which ink dots are formed, and printing an image, the apparatus comprising:

an ink-jet head comprising a plurality of nozzles for ejecting the energy radiation curable ink, the ink-jet head for ejecting the energy radiation curable ink to the recording medium;

a relative moving section for moving the recording medium to the ink-jet head relatively; and an energy radiation irradiation section comprising: a light emitting section for emitting the energy radiation, an irradiation control section for controlling a range on the recording medium to which the energy radiation is irradiated and a condenser for condensing the energy radiation to be an approximately parallel ray, the energy radiation irradiation section for irradiating the energy radiation to a portion on the recording medium on which the ink dots are formed;

wherein the apparatus prints the image on the recording medium by ejecting the energy radiation curable ink to the recording medium from the ink-jet head, and moving the recording medium to the ink-jet head relatively by the relative moving section;

the irradiation control section controls the range so as to correspond to a recording width of the ink-jet head;

the energy radiation curable ink comprises a polymerizable composition to form a polymer compound through polymerization reaction, an initiator for initiating the polymerization reaction when irradiated with the energy radiation, and a color material for coloring the energy radiation curable ink;

the initiator initiates the polymerization reaction when irradiated with the energy radiation having a wavelength which is within a range from 250 to 450 nm or 800 nm or longer; and the energy radiation curable ink has a viscosity of 6 to 500 mPa·s at 25° C.

15. The apparatus of claim 14, wherein the energy radiation irradiation section comprises a scanning section for scanning the recording medium by irradiating the energy radiation to the recording medium, the light emitting section emits the energy radiation from at least one of a laser device and a LED, and the irradiation control section controls the range by controlling a portion of the recording medium scanned by the scanning section.

16. The apparatus of claim 15, wherein the nozzles are arranged in a line, and the scanning section scans the recording medium with the energy radiation in a substantially parallel direction to a direction in which the nozzles are arranged.

17. The apparatus of claim 15, wherein the scanning section scans the recording medium with the energy radiation so that the ink dots are irradiated with the energy radiation after 0.02 to 500 ms since the energy radiation curable ink is placed on the recording medium.

18. The apparatus of claim 14, wherein the relative moving section comprises a cylindrical drum having an external surface on which the recording medium can be attached, and a driving rotating section for rotating the drum, and moves the recording medium to the ink-jet head relatively by rotating the drum in a condition that the recording medium is attached on the external surface of the drum.

19. The apparatus of claim 14, wherein the ink-jet head is a line head, and the relative moving section moves the recording medium to the ink-jet head relatively by carrying the recording medium in a vertical direction to the line head.

20. The apparatus of claim 14, wherein the nozzles are arranged so as to form the ink dots having a density of 300 dpi or higher on the recording medium when irradiating the energy radiation curable ink therefrom one time.

21. The apparatus of claim 14, wherein a wavelength of the energy radiation emitted from the light emitting section is within a range from 250 to 450 nm or 800 nm or longer.

22. The apparatus of claim 14, wherein the relative moving section changes a relative position of the recording medium to the ink-jet head at a speed within a range from 0.3 to 200 m/s.

23. The apparatus of claim 14, wherein the condenser comprises a collimator.

24. The apparatus of claim 14, wherein amount of addition of the initiator is within a range from 0.1 to 3 wt %.

25. The apparatus ink of claim 14, wherein the energy radiation curable ink further comprises an initiation auxiliary for giving excitation energy to the initiator when irradiated with the energy radiation, and making the initiator initiate the polymerization reaction.

26. An image recording apparatus for ejecting and placing energy radiation curable ink which is cured when irradiated with energy radiation according to an ink-jet recording method, irradiating the energy radiation on a recording medium on which ink dots are formed, and printing an image, the apparatus comprising:

an ink-jet head comprising a plurality of nozzles for ejecting the energy radiation curable ink, the ink-jet head for ejecting the energy radiation curable ink to the recording medium;

a relative moving section for moving the recording medium to the ink-jet head relatively; and an energy radiation irradiation section comprising: a light emitting section for emitting the energy radiation, an irradiation control section for controlling a range on the recording medium to which the energy radiation is irradiated and a condenser for condensing the energy radiation to be an approximately parallel ray, the energy radiation irradiation section for irradiating the energy radiation to a portion on the recording medium on which the ink dots are formed;

wherein the apparatus prints the image on the recording medium by ejecting the energy radiation curable ink to the recording medium from the ink-jet head, and moving the recording medium to the ink-jet head relatively by the relative moving section;

the irradiation control section controls the range so as to correspond to a recording width of the ink-jet head, wherein the condenser condenses the energy radiation so that a luminance of the energy radiation irradiated to the recording medium is 1000 mW/cm² or higher.

27. An image recording method for ejecting and placing energy radiation curable ink which is cured when irradiated with energy radiation according to an ink-jet recording method, irradiating the energy radiation on a recording medium on which ink dots are formed, and printing an image, the method comprising:

ejecting the energy radiation curable ink to the recording medium from a plurality of nozzles provided for an ink-jet head, moving the recording medium to the ink-jet head relatively, and forming the image;

condensing the energy radiation to be an approximately parallel ray; and controlling a range to which the energy radiation is irradiated, so as to correspond to a recording width of the ink-jet head, wherein a galvanometer mirror is used for controlling the range to which the energy radiation is irradiated.

28. An image recording apparatus for electing and placing energy radiation curable ink which is cured when irradiated with energy radiation according to an ink-jet recording method, irradiating the energy radiation on a recording medium on which ink dots are formed, and printing an image, the apparatus comprising:

an ink-jet head comprising a plurality of nozzles for ejecting the energy radiation curable ink, the ink-jet head for ejecting the energy radiation curable ink to the recording medium;

a relative moving section for moving the recording medium to the ink-jet head relatively; and an energy radiation irradiation section comprising: a light emitting section for emmiting the energy radiation, an irradiation control section for controlling a range on the recording medium to which the energy radiation is irradiated and a condenser for condensing the energy radiation to be an approximately parallel ray, the energy radiation irradiation section for irradiating the energy radiation to a portion on the recording medium on which the ink dots are formed;

wherein the apparatus prints the image on the recording medium by electing the energy radiation curable ink to the recording medium from the ink-jet head, and moving the recording medium to the ink-jet head relatively by the relative moving section;

the irradiation control section controls the range so as to correspond to a recording width of the ink-jet head, wherein the irradiation control section comprises a galvanometer mirror.

* * * * *